US012118608B2

(12) United States Patent
Haapoja et al.

(10) Patent No.: US 12,118,608 B2
(45) Date of Patent: *Oct. 15, 2024

(54) COMPUTER-IMPLEMENTED SYSTEMS AND METHODS FOR IN-STORE ROUTE RECOMMENDATIONS

(71) Applicant: Shopify Inc., Ottawa (CA)

(72) Inventors: Juho Mikko Haapoja, Toronto (CA); Byron Leonel Delgado, Ottawa (CA); Stephan Leroux, East Gwillimbury (CA); Daniel Beauchamp, Toronto (CA); Maas Mansoor Ali Lalani, Toronto (CA)

(73) Assignee: SHOPIFY INC., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/184,269

(22) Filed: Mar. 15, 2023

(65) Prior Publication Data
US 2023/0214909 A1 Jul. 6, 2023

Related U.S. Application Data

(63) Continuation of application No. 17/029,454, filed on Sep. 23, 2020, now Pat. No. 11,631,122.

(51) Int. Cl.
G06Q 30/0601 (2023.01)
G01C 21/20 (2006.01)
(Continued)

(52) U.S. Cl.
CPC ....... *G06Q 30/0639* (2013.01); *G01C 21/206* (2013.01); *G06Q 10/047* (2013.01);
(Continued)

(58) Field of Classification Search
CPC .... G06Q 10/04; G06Q 10/047; G06Q 30/015; G06Q 30/0251; G06Q 30/0261;
(Continued)

(56) References Cited

U.S. PATENT DOCUMENTS 6,047,270 A 4/2000 Joao et al.
6,123,259 A 9/2000 Ogasawara
(Continued)

FOREIGN PATENT DOCUMENTS

CN 102750274 A 10/2012
CN 103733216 A 4/2014
(Continued)

OTHER PUBLICATIONS

Interactive Shopping Experience through Immersive Store Environments. Mankodiya, K., Martins, R., Francis, J., Garduno, E., Gandhi, R., Narasimhan, P. (2013). In: Marcus, A. (eds) Design, User Experience, and Usability. User Experience and Usability. (Year: 2013).*
(Continued)

Primary Examiner — William J Allen

(57) ABSTRACT

A merchant may operate a retail store that users are able to visit in person in order to view and purchase products. When a user visits the store, the user might not know where a desired product ("target product") is located. Computer technology may help direct the user to the target product in real-time. In some embodiments, a model of passable areas and the location of products in the retail store may be determined, e.g. by a merchant device. In some embodiments, when the user visits the retail store, a computer generates a product recommendation, e.g. based on user-specific information, and a route in the retail store is determined for the user. In some embodiments, the route in the retail store may be determined using the model based on the target product, the user's location in the store, and one or more recommended products.

20 Claims, 15 Drawing Sheets

(51) Int. Cl.
*G06Q 10/047* (2023.01)
*G06Q 30/02* (2023.01)
*H04W 4/33* (2018.01)

(52) U.S. Cl.
CPC ..... *G06Q 30/0281* (2013.01); *G06Q 30/0631* (2013.01); *H04W 4/33* (2018.02)

(58) Field of Classification Search
CPC .......... G06Q 30/0255; G06Q 30/0267; G06Q 30/0269; G06Q 30/0281; G06Q 30/0601–0643; H04W 4/02–029; H04W 4/30–35; G01C 21/34; G01C 21/343; G01C 21/3446; G01C 21/3453; G01C 21/3476; G01C 21/206
See application file for complete search history.

(56) References Cited

U.S. PATENT DOCUMENTS

| | | | |
|---|---|---|---|
| 6,587,835 | B1 | 7/2003 | Treyz |
| 7,499,799 | B2 | 3/2009 | Park |
| 7,580,699 | B1 | 8/2009 | Shaw et al. |
| 7,865,308 | B2 | 1/2011 | Athsani et al. |
| 8,254,881 | B2 | 8/2012 | Shaw et al. |
| 8,626,200 | B2 | 1/2014 | Shaw et al. |
| 11,436,809 | B2 | 9/2022 | Rizvi et al. |
| 2002/0053082 | A1 | 5/2002 | Weaver et al. |
| 2003/0027581 | A1 | 2/2003 | Jokinen et al. |
| 2003/0043183 | A1 | 3/2003 | Sakakibara et al. |
| 2004/0185825 | A1 | 9/2004 | Preiss et al. |
| 2005/0193037 | A1 | 9/2005 | Adiba et al. |
| 2006/0131385 | A1 | 6/2006 | Kim |
| 2006/0131390 | A1 | 6/2006 | Kim |
| 2008/0045238 | A1 | 2/2008 | Zhou et al. |
| 2008/0140507 | A1 | 6/2008 | Jamlisch et al. |
| 2008/0298230 | A1 | 12/2008 | Luft et al. |
| 2013/0030915 | A1 | 1/2013 | Statler et al. |
| 2014/0032360 | A1 | 1/2014 | Nicholson |
| 2015/0112826 | A1 | 4/2015 | Crutchfield, Jr. |
| 2015/0186982 | A1 | 7/2015 | Higgins et al. |
| 2016/0125505 | A1 | 5/2016 | Goulart et al. |
| 2016/0223339 | A1 | 8/2016 | Pellow et al. |
| 2018/0053236 | A1 | 2/2018 | Fransen et al. |
| 2018/0218441 | A1 | 8/2018 | Kumar et al. |
| 2019/0251619 | A1 | 8/2019 | Kuchenski et al. |
| 2020/0309545 | A1 | 10/2020 | Michel et al. |
| 2021/0166283 | A1 | 6/2021 | Black et al. |
| 2022/0092681 | A1 | 3/2022 | Haapoja et al. |

FOREIGN PATENT DOCUMENTS

| | | |
|---|---|---|
| CN | 107609945 A | 1/2018 |
| CN | 109246617 A | 1/2019 |
| CN | 109579851 A | 4/2019 |
| CN | 110235165 A | 9/2019 |
| JP | 5497936 B1 | 5/2014 |
| JP | 2018005515 A | 1/2018 |
| TW | 201229796 A | 7/2012 |
| WO | 2015103020 A1 | 7/2015 |

OTHER PUBLICATIONS

The path-to-purchase is paved with digital opportunities: An inventory of shopper-oriented retail technologies. Willems et al. available online. Nov. 21, 2016. (Year: 2016).

Wikipedia Article, "A* search algorithm", published on Wikipedia website on Sep. 13, 2020. Accessed on Sep. 23, 2020, at https://en.wikipedia.org/wiki/A*_search_algorithm, 12 pages.

* cited by examiner

User Profile
309

Personal Information 802
*User ID:* 57468556
*User Name:* Fred
*Sex:* Male
*Age:* 30-39
*Address:* 235 Peel Crescent, Toronto, Canada M5M 1X1
...

Preferences 804
Preferred Color: Blue
Preferred Material: Flannel
Preferred Pattern: None
...

Browsing history 808
Products visited online in last 7 days:
- Flannel Shirt Black
- Flannel Shirt Red
...

Billing Information 810
Credit Card: Visa, XXXX-XXXX-XXXX-1234, Exp 07/20
Billing Address: 235 Peel Crescent, Toronto, M5M 1X1
...

Purchase History 806

| Date | Product Description | Product SKU | Merchant |
|---|---|---|---|
| Apr 15/19 | Blue Jeans 32in x 34in | JX1524BJ34 | Jane |
| Oct 23/19 | Flannel Shirt — Green, Large | JX1264SFG4 | Jane |
| Mar 10/20 | Wallet — Brown Leather | KY6477WL88 | Kathy |
| ... | | | |

FIG. 8

Product Inventory and Location Data 311 / 902

| Product Name | Product Description | Product SKU | Quantity | Location |
|---|---|---|---|---|
| Men's Blue Jeans | Material: Denim<br>Color: Blue<br>Size: 32in x 34in | JX1524BJ34 | 4 | (235, 456, 10) |
| Men's Blue Jeans | Material: Denim<br>Color: Blue<br>Size: 32in x 34in | JX1524BJ34 | 2 | (541, 956, 15) |
| Men's Black Jeans | Material: Denim<br>Color: Black<br>Size: 32in x 34in | JX1544BLJ4 | 3 | (235, 753, 10) |
| Men's Solid Flannel Shirt | Material: Flannel<br>Color: Blue<br>Size: Large | JX1264SFB4 | 2 | (695, 332, 5) |
| Men's Belt | Material: Leather<br>Color: Black<br>Size: 32in | JX2564LBB3 | 6 | (95, 630, 10) |
| ... | ... | ... | ... | ... |

904 — Product Description; 906 — Product SKU; 908 — Quantity; 910 — Location

COMPUTER-IMPLEMENTED SYSTEMS AND METHODS FOR IN-STORE ROUTE RECOMMENDATIONS

CROSS-REFERENCE TO RELATED APPLICATIONS

This application is a continuation of U.S. patent application Ser. No. 17/029,454, entitled "Computer-Implemented Systems and Methods for In-Store Route Recommendations", which was filed on Sep. 23, 2020, the entire contents of which are incorporated herein by reference.

FIELD

The present application relates to navigation and, more particularly, to the use of computer technology to assist with locating a product, and recommending a route to reach the product, in a physical retail store.

BACKGROUND

A merchant may operate a physical retail store that users are able to visit in person in order to view and purchase products. A physical retail store is sometimes alternatively referred to as a "brick and mortar" store.

Computer technology is currently used to assist users (e.g. a customer) with finding a product in the physical retail store. For example, a user may use their user device (e.g. mobile phone) in order to access a software application ("app") that allows the user to search a catalog of products for sale in the store. The app may indicate the aisle in which the product is located.

SUMMARY

It is desired to use computer technology to help direct the user in a particular direction in the store (e.g. along a particular route) to ultimately lead the user to the product the user has specifically requested, referred to as the "target product". However, based on where the user is located in the store, there may be multiple routes to the target product. For example, the user may be at the front of the store, the target product at the back of the store, and the user could feasibly walk down any one of several possible parallel aisles in order to reach the target product.

When the choice of multiple routes to the target product exists, the user is preferably directed to take a route that passes one or more recommended products. A "recommended product", as used herein is not a product that is necessarily explicitly recommended to a user (although it could be). Rather, a recommended product is one that is predicted to possibly be of interest to the user, and/or a product for which an increase in sales is desired by the merchant. A route is recommended and preferably taken that favors walking by one or more recommended products. For example, if the target product is men's blue jeans, and the user has already previously purchased a belt but has not purchased shirts, then shirts may be a recommended product for the user. It may be preferable to direct the user down the aisle displaying shirts, rather than down the aisle displaying belts when guiding the user to the men's blue jeans. The route leading down the aisle displaying shirts may be recommended via the user interface of the user's device.

The computer is faced with the computational challenge of trying to determine the recommended route along which the user should be directed. Computation of this route might not be based solely on shortest distance to the target product, but may also or alternatively be based on factors that may vary on a user-by-user basis, such as the previous commerce activity of the user. The route may also or instead be based on factors that may vary on a product-by-product basis, e.g. if the target product is sunscreen then sun hats may be recommended and so the route may preferably pass by sun hats. The route may also or instead be based on factors that may be merchant specific and dynamically vary, e.g. the merchant has socks on clearance this week and so socks may be a recommended product by which the user preferably walks.

In one embodiment, a computer-implemented method may be provided. The method may begin with a step in which an identification of a target product for sale by a merchant in a retail store is obtained. The identification may originate from an input at a user device. Then, a recommendation step may be performed in which a recommended product is obtained based on at least one of: the target product, information from a profile associated with the user device, or a criterion provided by the merchant. As the user device moves in the retail store, steps relating to providing the user with a recommended route are performed. Providing the user with a recommended route may include: receiving user location data indicating a location of the user device within the retail store; generating an instruction guiding the user device along a particular route based on the user location data, a location of the target product, and a location of the recommended product; and, transmitting the instruction for output at the user device.

In some implementations, the particular route may be associated with a plurality of contiguous segments stored in memory. Each segment of the plurality of contiguous segments may correspond to a respective different passable area of the retail store. Each segment may be assigned a respective cost value. In such implementations, the method may further include generating a plurality of instructions that guide the user device along the particular route based on a comparison of cost values between segments of alternative routes to the target product. In some implementations, each segment may be assigned the respective cost value based at least on the location of the target product. In some implementations, the cost value of at least one of the segments may be based on both the location of the target product and the location of the recommended product.

In some implementations, the particular route along which the user device is guided may pass through a set of segments each having cost values lower than the cost values of alternative segments on the alternative routes. The set of segments may include a particular segment. The recommended product may be in proximity to the particular segment. The cost value of the particular segment may be lower than if the recommended product was not in proximity to the particular segment.

In some implementations, the recommended product is a first recommended product, and the method may further include obtaining a second recommended product based on at least one of: the information from the profile associated with the user device, the target product, or a criterion provided by the merchant. The method may further include assigning a first cost value to a first segment based on both the location of the target product and the location of the first recommended product. The method may further include assigning a second cost value to a second segment based on both the location of the target product and the location of the second recommended product. In some such implementations, the first cost value may be assigned a different value than the second cost value, e.g. based on: (i) the first recommended product being in a different category than the second recommended product; and/or (ii) the first recommended product being on a first path to the target product that is shorter than a second path to the target product on which the second recommended product is located.

In some implementations, the first cost value may be assigned a different value than the second cost value based on the first recommended product being in a different category than the second recommended product. In some such implementations, the first recommended product may belong to a first category, the second recommended product may belong to a second category, and the first category may be that the recommendation is based on both the information from the profile associated with the user device and the target product.

In some implementations, the second recommended product may be in proximity to the second segment, and the second cost value of the second segment may be the same as if the second recommended product was not in proximity to the second segment.

In some implementations, the method may further include obtaining at least some of the plurality of contiguous segments by monitoring movement of a merchant device through the retail store and mapping different physical locations of the merchant device to different segments.

In some implementations, the instruction guiding the user device may be implemented as a visual guide, e.g. in the form of an augmented reality digital image on a screen of the user device.

In some implementations, the method may include determining that the user device is in proximity to the recommended product, e.g. based on the user location data and the location of the recommended product. The method may further include in response to determining that the user device is in proximity to the recommended product: transmitting a message for output at the user device. The message may be for drawing attention to the recommended product.

In some implementations, the information from the profile associated with the user device may include purchase history of a user. The recommended product may be generated at least based on the purchase history.

In some implementations, the information from the profile associated with the user device may include an indication of one or more products viewed online by a user. In some such implementations, the recommended product may be generated at least based on the indication of the one or more products viewed online by the user.

A system is also disclosed that is configured to perform the methods disclosed herein. For example, the system may include a memory to store information, e.g. to store the identification of the target product, and at least one processor to directly perform (or instruct the system to perform) the method steps.

In another embodiment, there is provided a computer-readable medium having stored thereon computer-executable instructions that, when executed by a computer, cause the computer to the perform operations of the methods disclosed herein.

BRIEF DESCRIPTION OF THE DRAWINGS

Embodiments will be described, by way of example only, with reference to the accompanying figures wherein:

FIG. 8 illustrates an example user profile, according to one embodiment;

FIG. 9 illustrates an example of product inventory and location data for a retail store, according to one embodiment;

FIGS. 10 to 12 illustrate examples of models of passable areas with cost values assigned to cells, according to some embodiments;

DETAILED DESCRIPTION

For illustrative purposes, specific example embodiments will now be explained in greater detail below in conjunction with the figures.

Example E-Commerce Platform

In some embodiments, the methods disclosed herein may be performed on or in relation to a commerce platform, which will be referred to herein as an e-commerce platform. Therefore, for completeness, an example of an e-commerce platform will first be described.

Figure 1:
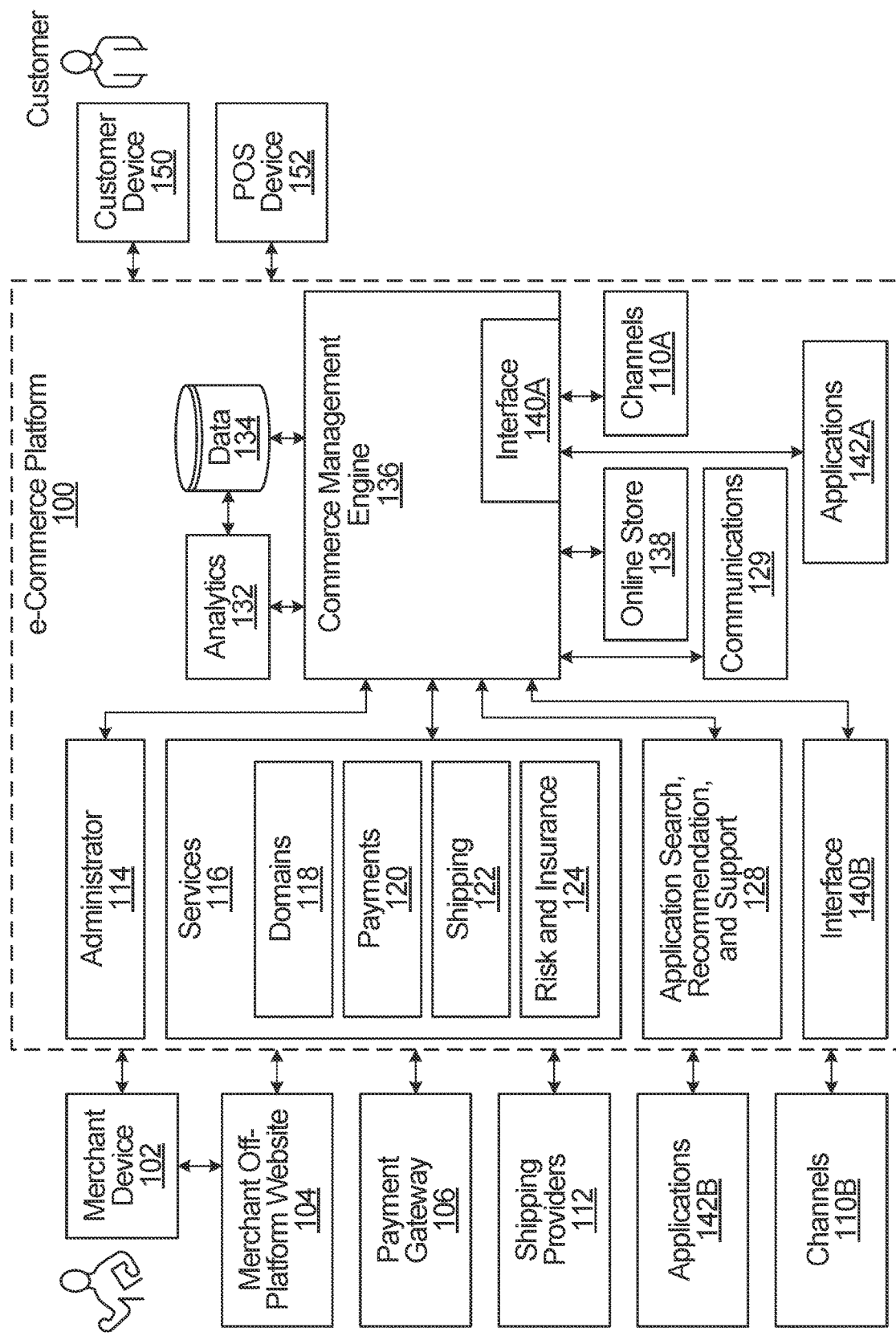
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other Internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their web site's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

Figure 2:
FIG. 2 is an example of a home page of an administrator, according to one embodiment.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partner-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual, augmented or mixed reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the check-out apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Use of the E-Commerce Platform 100 for Route Guidance in a Physical Retail Store A merchant having a merchant account on the e-commerce platform 100 may have a physical retail store. The merchant might or might not also have an online store. The physical retail store may have a physical layout with traversable (e.g. walkable) paths, also known as passable areas. The products within the physical retail store may be accessible via the passable areas, and both the product locations and passable areas may be stored in the e-commerce platform 100.

A visitor may enter the merchant's physical retail store in search of a particular product, without knowing where the product is located within the physical retail store. The visitor may be referred to as a user. The visitor may have a user account on the e-commerce platform 100 and have an associated user profile stored in the e-commerce platform 100. The user profile may be stored as part of the data 134 in memory. The user profile may store user-specific information, such as previous purchase history of the user, and/or preferences of the user, and/or clothing size of the user, and/or previous interactions the user had with merchants on the e-commerce platform (such as text or email exchanges), and/or address information for the user, and/or billing information for the user, etc. Some of the information stored in the user profile may be associated with the merchant running the physical retail store (e.g. previous purchase history of products sold by that merchant to the user). Other information in the user profile might not be specifically related to the merchant running the physical retail store (e.g. previous purchase history of products bought by the user that were sold by other merchants on the e-commerce platform 100). The user associated with the user profile might have never visited the merchant's physical retail store in the past and/or might have never viewed or purchased any product sold by that merchant, and yet the person might still have a user profile stored in the e-commerce platform 100, e.g. a user profile that indicates preferences of the user, previous purchase history with other merchants on the e-commerce platform 100, etc. If the user does not have a user profile, then a user profile for the visitor may be created when the visitor first enters the merchant's physical retail store, e.g. by assigning a unique and new user ID to the user and populating information in the user profile once learned (e.g. if the person makes a purchase).

The e-commerce platform 100 may include a store routing engine that assists the visitor in finding a particular target product within the physical retail store by generating real-time route guidance within the store. The store routing engine may also guide the visitor to pass by products that the engine determines to be recommended products for sale in the merchant's physical retail store, where the recommended product may be determined based on information such as: the target product, and/or user-specific information (e.g. information stored in the user's profile in the e-commerce platform 100), and/or merchant-based criterion. A route recommendation generated by the store routing engine may guide a visitor to the target product based on the physical location of the visitor in the merchant's retail store, the location of the target product, and the location of one or more recommended products (e.g. based on product inventory and location data stored in the memory in the e-commerce platform 100). In some embodiments, product recommendation rules and models of the passable areas in the physical retail store are stored in memory in the e-commerce platform 100 and used to generate the product recommendations.

Figure 3:
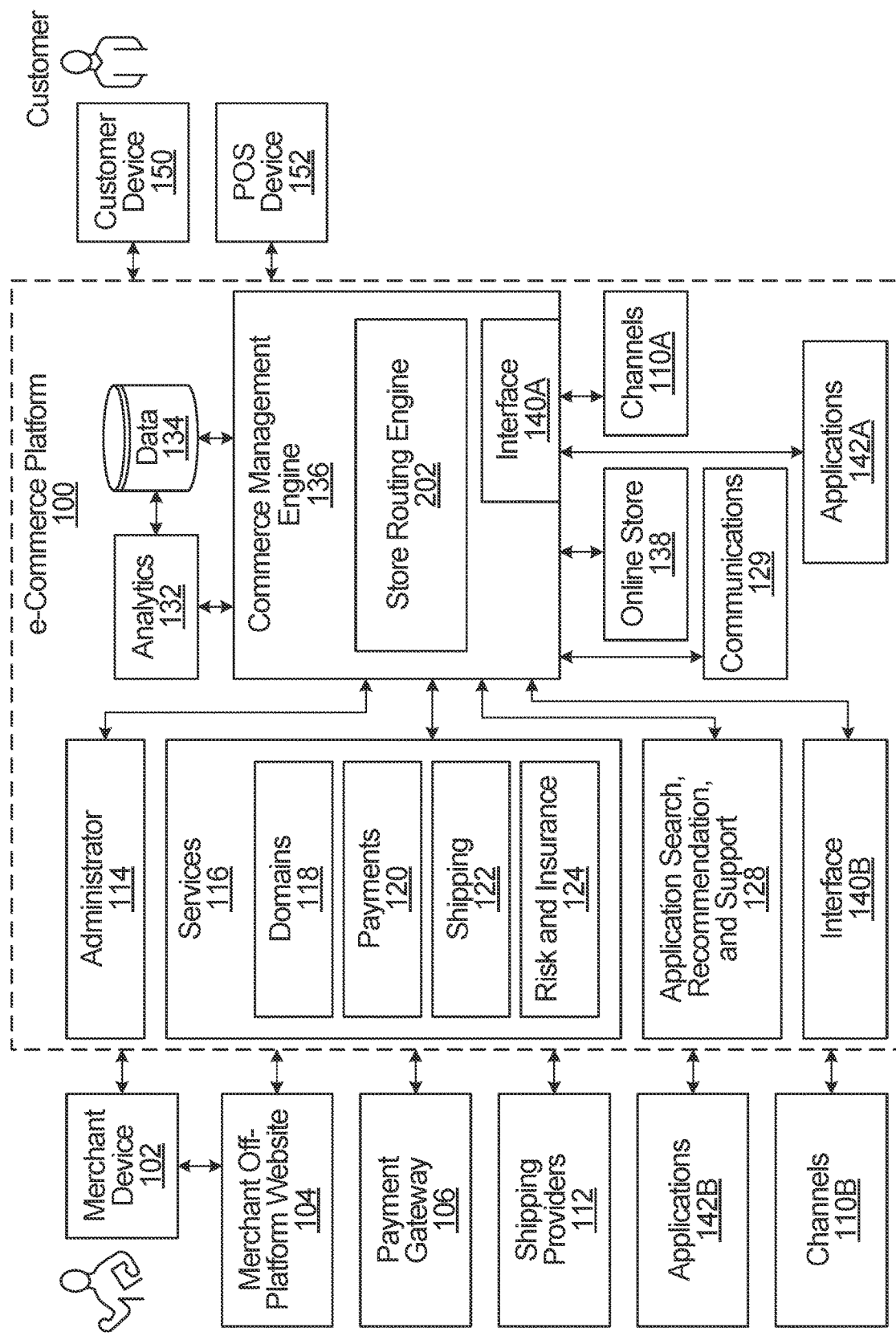
FIG. 3 illustrates the e-commerce platform of FIG. 1, but with a store routing engine.

FIG. 3 illustrates the e-commerce platform 100 of FIG. 1, but with a store routing engine 202 in the commerce management engine 136. The store routing engine 202 performs the store routing methods disclosed herein, e.g. determining a route for a user in a physical retail store. For example, the store routing engine 202 may determine a target product and user profile associated with a visitor in a physical retail store, and provide route guidance to reach the target product where the route may include passing by one or more recommended products. The store routing engine 202 may be implemented by one or more general-purpose processors that execute instructions stored in a memory or stored in another computer-readable medium. The instructions, when executed, cause the store routing engine 202 to perform the operations of the store routing engine 202. The store routing engine 202 is used to provide a visitor of a physical retail store with route guidance to a particular target product or location, e.g. as described herein. Alternatively, some or all of the store routing engine 202 may be implemented using dedicated circuitry, such as an application specific integrated circuit (ASIC), a graphics processing unit (GPU), or a programmed field programmable gate array (FPGA). In some embodiments, the store routing engine 202 may be located externally to the e-commerce platform 100.

Although the embodiments described below may be implemented using the store routing engine 202 implemented in e-commerce platform 100, the embodiments described below are not limited to the specific e-commerce platform 100 of FIGS. 1 to 3 and could be used in connection with any e-commerce platform. In some embodiments, implementation on or in association with an e-commerce platform is not even required. For example, the functionality described herein may be implemented as a stand-alone component or service (e.g. external to the e-commerce platform 100) or implemented fully or in part by a local computing device (e.g. user device) in the physical retail store. Therefore, the embodiments below will be described more generally.

Example System for In-Store Route Guidance in a Physical Retail Store

Figure 4:
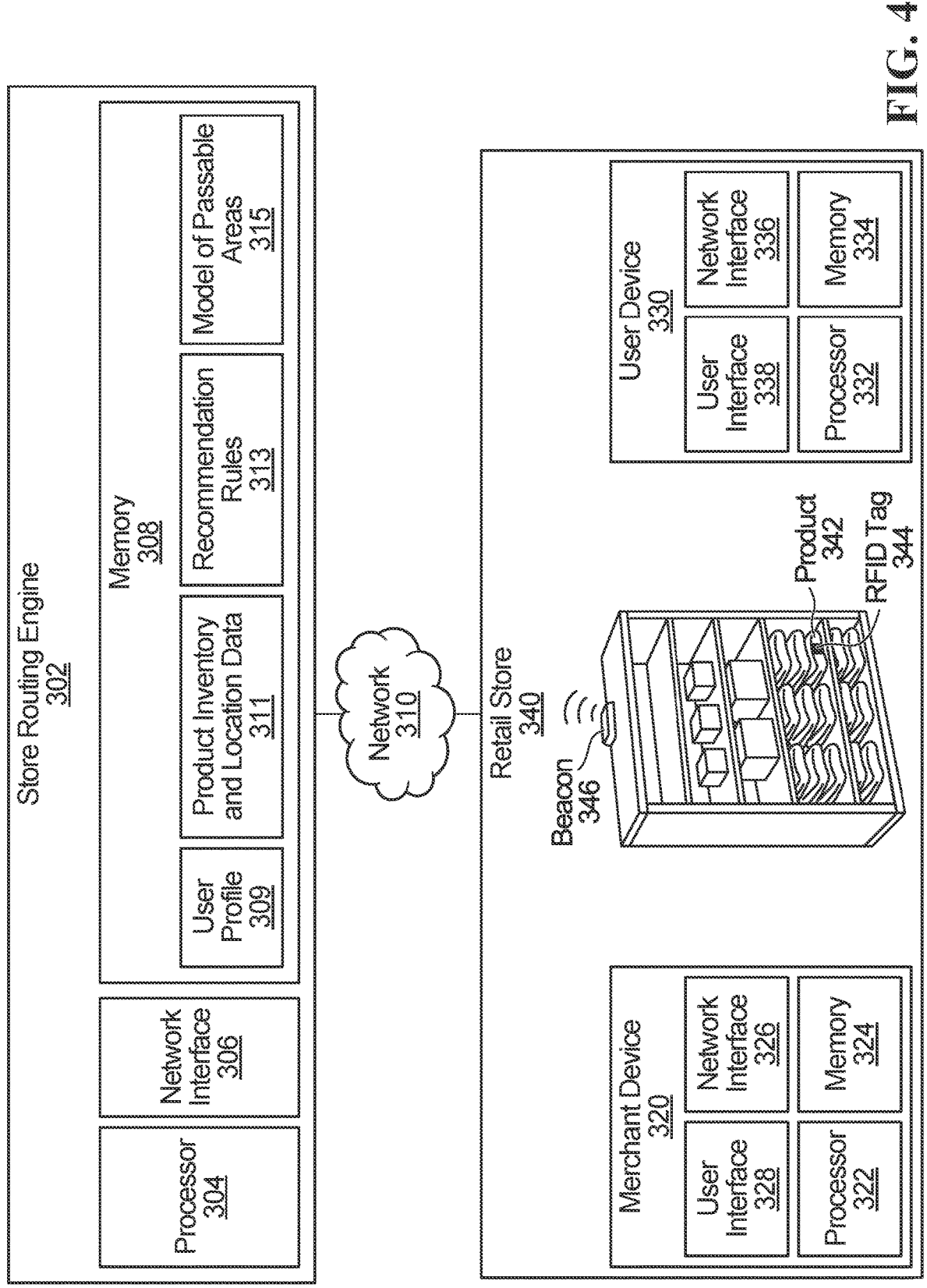
FIG. 4 illustrates a system for determining routes for a user in a physical retail store, according to one embodiment.

FIG. 4 illustrates a system for in-store route guidance in a physical retail store, according to one embodiment. The system includes a store routing engine 302 and at least one physical retail store 340. Only a single physical retail store 340 is illustrated.

The store routing engine 302 includes a processor 304 for implementing the operations described herein that are performed by the store routing engine 302, e.g. operations such as identifying passable areas in the retail store 340 and generating route recommendations for a visitor seeking a target product in the retail store 340 based on particular information (e.g. location within the store, location of other recommended products). The processor 304 may be implemented by one or more general purpose processors that execute instructions stored in a memory (e.g. in memory 308). The instructions, when executed, cause the processor 304 to directly perform or, alternatively, instruct the store routing engine 302 to perform the operations of the store routing engine 302. In other embodiments, the processor 304 may be implemented using dedicated circuitry, such as a programmed field-programmable gate array (FPGA), a graphical processing unit (GPU), or an application-specific integrated circuit (ASIC).

The store routing engine 302 further includes a network interface 306. The network interface 306 is for communicating over a network 310, e.g. to communicate with merchant device 320 and/or user device 330 described below. The network interface 310 may be implemented as a network interface card (NIC), and/or a computer port (e.g. a physical outlet to which a plug or cable connects), and/or a network socket, etc., depending upon the implementation.

The store routing engine 302 further includes a memory 308. A single memory 308 is illustrated in FIG. 4, but in implementation the memory 308 may be distributed. The memory 308 stores a user profile 309 for each user identified in the store routing engine 302, product inventory and product location data 311 for each product in stock in the retail store 340, recommendation rules 313, and a model of passable areas 315. Only a single user profile 309 is illustrated in FIG. 4. The user profile 309 may be established when the user first visits the retail store 340, or possibly prior to the user first visiting the retail store 340, e.g. if the user uses a software application (such as a "shopping app") to separately register with the store routing engine 302 and create a profile, and/or when the user purchases a product in another store of another merchant. The product inventory and product location data 311 includes a record of each product in stock in retail store 340, as well as a location of that product in the retail store 340. The recommendation rules 313 stored in memory 308 are rules that may incorporate criteria, such as the target product, merchant-specified criteria, and user-specific criteria based on the user profile 309, in order to provide the user recommendations of other products found within the product inventory data 311 relating to the retail store 340. The model of passable areas 315 in memory 308 includes paths in the retail store 340 that have been determined to be passable (e.g. walkable), and can be used to direct a user to a target and/or recommended product. The model of passable areas 315 may be determined using the merchant device 320, as further described herein.

In some embodiments, the store routing engine 302 may be implemented inside of an e-commerce platform. In some embodiments, some or all of the processor 304, memory 308, and/or network interface 306 may be located outside of the store routing engine 302.

The retail store 340 includes products for sale, e.g. product 342. In some embodiments, each product may include a feature that allows the product to be uniquely identified from other products or other product types. For example, the feature may be a radio-frequency identification (RFID) tag 344 or some other machine-readable indicium such as, for example, some form of visual machine-readable indicia such as, for example, a barcode or a QR code. As explained later, this feature (if present) may optionally be used to help determine the location of the product in the retail store 340. In some embodiments, one or more wireless transmitters, e.g. beacon 346, may be present in the retail store 340 to wirelessly communicate with the user device 330 and/or merchant device 320. The wireless communication may be over Bluetooth™, e.g. Bluetooth low energy (LE). In some embodiments, the wireless communication may be over ultrawide band (UWB).

The retail store 340 includes a merchant device 320, which is a computing device used by a merchant of the retail store 340. The merchant device 320 may be a smartphone, laptop, tablet, glasses or headset, which may be configured for augmented reality (AR), mixed reality (MR) or virtual reality (VR), depending upon the implementation. The merchant device 320 includes a processor 322, a memory 324, a user interface 328, and a network interface 326. The processor 324 directly performs, or instructs the merchant device 320 to perform, the operations of the merchant device 320 described herein, e.g. determining the model of passable areas 315 and the product inventory and location data 311 of the products in the retail store 340, and communicating this information to the store routing engine 302 over network 310. The processor 322 may be implemented by one or more general purpose processors that execute instructions stored in a memory (e.g. memory 324). The instructions, when executed, cause the processor 322 to directly perform, or instruct the merchant device 320 to perform, the operations of the merchant device 320 described herein. In other embodiments, the processor 322 may be implemented using dedicated circuitry, such as a programmed FPGA, a GPU, or an ASIC. The user interface 328 may be implemented as a display screen (which may be a touch screen and possibly integrated into an AR, MR or VR device such as a headset or glasses, generally denoted herein as "AR device"), and/or a keyboard, and/or a mouse, and/or a ring and/or a speaker etc., depending upon the implementation. The network interface 326 is for communicating over a network, e.g. to communicate with the store routing engine 302 and/or a beacon 346, possibly over network 310. The structure of the network interface 326 will depend on how the merchant device 320 interfaces with the network. For example, if the merchant device 320 is a mobile phone, tablet, or AR device, the network interface 326 may comprise a transmitter/receiver with an antenna to send and receive wireless transmissions to/from the network. If the merchant device 320 is a personal computer connected to the network with a network cable, the network interface 326 may comprise a network interface card (NIC), and/or a computer port (e.g. a physical outlet to which a plug or cable connects), and/or a network socket, etc.

A visitor may be in retail store 340, and that visitor may have an associated computing device, which is labelled as user device 330 in FIG. 4. The visitor may be referred to as a "user". The user device 330 could be a mobile phone carried by the visitor, but may instead be a tablet, laptop, AR device, etc., depending upon the scenario. The user device 330 includes a processor 332, a memory 334, a user interface 338, and a network interface 336. The processor 332 directly performs, or instructs the user device 330 to perform, the operations of the user device 330 described herein, e.g. communicating with the store routing engine 302 to provide the user ID of the user, possibly communicating with beacons in the retail store 340 (e.g. beacon 346), receiving route guidance to a target product and/or location, etc., depending upon the implementation. The processor 332 may be implemented by one or more general purpose processors that execute instructions stored in a memory (e.g. memory 334). The instructions, when executed, cause the processor 332 to directly perform, or instruct the user device 330 to perform, the operations of the user device described herein. In other embodiments, the processor 332 may be implemented using dedicated circuitry, such as a programmed FPGA, a GPU, or an ASIC. The user interface 338 may be implemented as a display screen (which may be a touch screen), and/or a keyboard, and/or a mouse, and/or a speaker etc., depending upon the implementation. The network interface 336 is for communicating over a network, e.g. communicating with the store routing engine 302 and/or the merchant device 320 and/or beacon 346, possibly over the network 310. The structure of the network interface 336 will depend on how the user device 330 interfaces with the network. For example, if the user device 330 is a mobile phone or tablet, the network interface 336 may comprise a transmitter/receiver with an antenna to send and receive wireless transmissions to/from the network. If the user device 330 is a laptop connected to the network with a network cable, the network interface 336 may comprise a network interface card (NIC), and/or a computer port (e.g. a physical outlet to which a plug or cable connects), and/or a network socket, etc.

In some embodiments, the store routing engine 302 is part of an e-commerce platform, e.g. e-commerce platform 100. For example, the store routing engine 302 may be store routing engine 202 illustrated in FIG. 3. However, this is not necessary. The store routing engine 302 may instead be provided by another component of an e-commerce platform or implemented as a stand-alone component or service that is external to an e-commerce platform. In some embodiments, either or both of the applications 142A-B of FIG. 3 may provide the store routing engine 302 in the form of a downloadable application that is available for installation in relation to a merchant and/or user (customer) account. In some embodiments, at least a portion of the store routing engine 302 could be implemented on a merchant device, e.g. on merchant device 102 of FIG. 3 or merchant device 320 of FIG. 4. For example, the merchant device could store and run some or all of the store routing engine 302 locally as a software application. In some embodiments, at least a portion of the store routing engine 302 could be implemented on a customer device, e.g. on customer device 150 of FIG. 3 or user device 330 of FIG. 4. For example, the customer device could store and run some or all of the store routing engine 302 locally as a software application. In some embodiments, some or all of the store routing engine 302 could be implemented on a computing device in the retail store 340, and that computing device might or might not be the same computing device as the merchant device 320. FIG. 4 illustrates the store routing engine 302 as separate from the merchant device 320, the user device 330, and the physical retail store 340. The embodiments described below will assume that the store routing engine 302 is separate from the merchant device 320, the user device 330, and the physical retail store 340, as illustrated.

Determining Routes in a Physical Retail Store

The store routing engine 302 may provide a visitor of the retail store 340 with a recommended route for reaching a target product within the store 340 after establishing the product inventory and location data 311 and model of passable areas 315 in memory 308. This data stored in memory 308 may be used in conjunction with data specific to the visitor (e.g. the visitor's location possibly along with information from user profile 309) in order to determine the recommended route, which is presented to the visitor in real-time through the user interface 338 of user device 330.

For example, a user, Fred, may enter physical retail store 340 "Jane's Menswear" with the intention of purchasing a product 342, "men's blue jeans". The store routing engine 302 may assist Fred in finding the men's blue jeans, as well as other products that Fred may be interested in, in Jane's Menswear's physical retail store 340.

Figure 5:
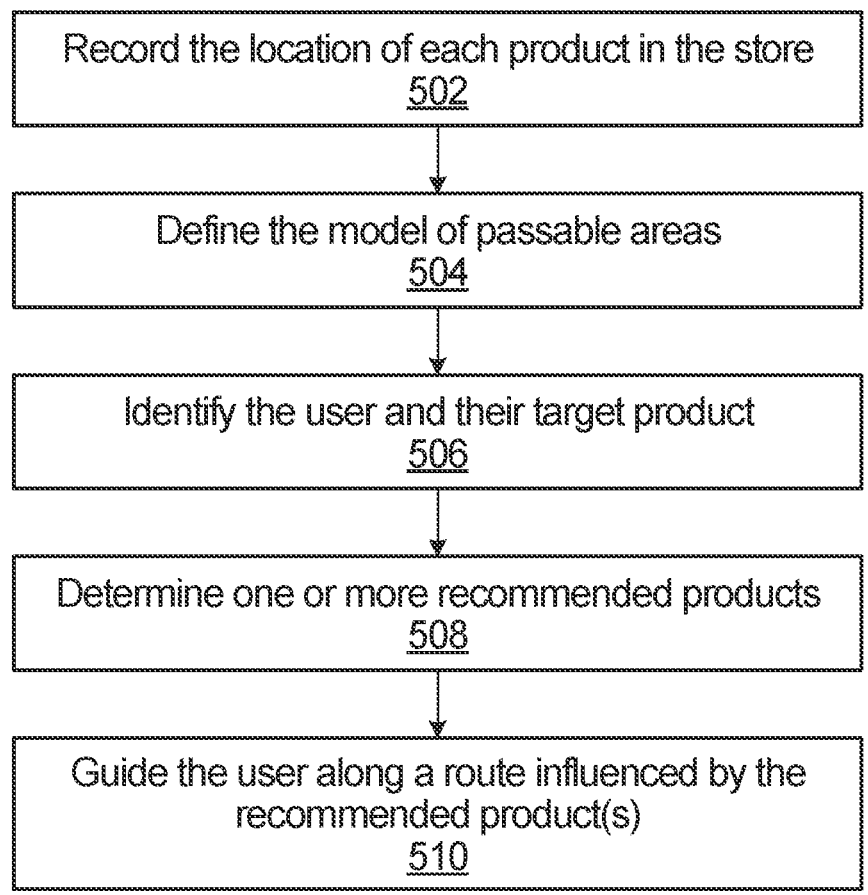
FIG. 5 is a method for determining routes in a physical retail store to guide a user to recommended and target products, according to one embodiment.

FIG. 5 provides a method for determining routes in physical retail store 340, in which the steps described herein are performed to ultimately guide a user to recommended and target products, according to some embodiments. Method 500 may be performed by a computing device associated with a store routing engine (e.g. a processor or combination of processors such as the processor 304 in store routing engine 302). Method 500, as specifically described below, is executed by the processor 304 of the store routing engine 302, in communication with the merchant device 320 and user device 330 in the retail store 340.

At step 502 of method 500, the location of each product in retail store 340 is recorded. The data so recorded ("recorded data") may be saved in memory 308 of the store routing engine 302 as the product inventory and location data 311. The product inventory and location data 311 may comprise a 2D or 3D model of the retail store 340, and may be generated by a merchant using a merchant device 320 walking through a retail store 340 using methods described herein, according to some embodiments. For example, Merchant Jane may traverse her physical retail store 340, Jane's Menswear, and scan RFID tags on each product for sale using merchant device 320 with a built-in RFID reader. Merchant Jane may scan the RFID tag of men's blue jeans, and the location of the men's blue jeans may be determined by the store routing engine 302 based on the location of Merchant Jane's merchant device 320 at the time of scanning with reference to a defined starting location in the physical retail store 340. The location of the men's blue jeans is stored in the product inventory and location data 311 in memory 308. The use of RFID tags is just an example, e.g. other types of technologies, e.g. other types of beacons such as Bluetooth™, may instead be implemented.

The model of passable areas 315 is defined at step 504 of method 500. The model of passable areas 315 provides a mapping of traversable (e.g. walkable) paths within the physical retail store 340, which is stored in memory 308 of the store routing engine 302. The model may be determined based on a merchant traversing through the physical retail store 340 using a merchant device 320 (e.g. at the same time as recording the location of each product in step 502). Additionally or alternatively, the model may be determined based on a mapping of the physical retail store, and/or traffic patterns of users determined using an in-store radar, etc., some embodiments of which are described herein. For example, Merchant Jane may define the model of passable areas 315 in her physical retail store 340, Jane's Menswear, by first defining a virtual coordinate representation of the store and then moving around the store with her merchant device 320. The model 315 may assume that regions of the store that Jane traverses are passable areas, and that regions where she does not traverse are obstructed.

Next, a user and their target product are identified at step 506 of method 500. An identity of a visitor, such as a user associated with user device 330, and product the visitor is searching for, i.e. the target product, are determined using the store routing engine 302. The visitor may use their user device 330 to access a software application associated with the retail store 340 and/or associated with an e-commerce platform. The software application may communicate with or be part of store routing engine 302 and access a saved user profile, such as user profile 309 stored in memory 308. The visitor may be able to identify their target product from the same application on their user device 330 based on the product inventory and location data 311 stored in memory 308 of the store routing engine 302. For example, Fred may enter the Jane's Menswear's retail store 340 and log in to the store's associated software application. The store routing engine 302 may identify that Fred has logged in to the application via network 310 and bring up his user profile 309. Through user interface 338 of Fred's user device 330, Fred may indicate that his target product is men's blue jeans, based on Jane's Menswear's inventory presented to Fred through the software application. The target product may be accessed by the store routing engine 302 via network 310.

At step 508 of method 500, one or more recommended products are determined. For a particular user identified in step 506, the one or more recommended products are additional products that the user may be interested in, and may be identified by the store routing engine 302 based on at least one of: the target product, criteria indicated by the merchant, or user-specific criteria based on information from user profile 309. The store routing engine 302 may use recommendation rules 313 stored in memory 308 to recommend a product to a visitor who has identified a target product. For example, Fred may indicate that he is seeking men's blue jeans in Jane's Menswear retail store 340. The store routing engine 302 may identify a blue flannel shirt as a recommended product for Fred based on a preference for the color blue noted on Fred's user profile 309 and Fred's purchase history indicating that he has not recently purchased a shirt.

Lastly, at step 510 of method 500 the user is guided along a route influenced by the one or more recommended products. The processor 304 of store routing engine 302 may determine a route to guide the user to their target product based on the model of passable of areas 315, where the user is guided to pass by products recommended based on the recommendation rules 313. The store routing engine 302 may guide the user through retail store 340 using one or more instructions provided at the user interface 338 of user device 338. For example, the store routing engine 302 may provide Fred with real-time guidance inside Jane's Menswear retail store 340 through a software application (e.g. a browser-based application or a native application) on Fred's user device 330. The store routing engine 302 may direct Fred through an aisle where a recommended product, such as blue flannel shirts, are displayed on the way to Fred's target item, which are men's blue jeans.

In some embodiments, the steps of method 500 may be performed in varying orders. In some embodiments, some of the steps of method 500 may be performed partially or fully in parallel, e.g. steps 502 and 504 may be performed in parallel. In some embodiments, some of the steps of method 500 might not be performed.

Recording the Location of Each Product in the Store

Step 502 of method 500 records the location of each product in retail store 340. To be able to direct a user to a target product and to other recommended products in retail store 340, the location of products in the store must be known.

In one embodiment, recording the location of products in the retail store comprises mapping the space of the retail store to a virtual coordinate space, in which each product is assigned an (x, y, z) coordinate in that space. For example, the merchant may traverse their physical retail store 340 with a merchant device, such as merchant device 320, beginning from an initial location (e.g. the front of the store). The merchant device 320 may be or include a barcode scanner or an RFID scanner. The initial location is assigned as the origin (0, 0, 0) of the virtual coordinate space. In some implementations, the origin may be associated with a fixed machine readable indicium such as, for example, a barcode or QR code, e.g. the merchant may start recording their location by scanning a particular machine readable indicium (e.g. a QR code) at the front of the store, which designates the origin of the virtual space, from which the merchant then begins to traverse the store. As the merchant device 320 moves throughout the store, the location of the merchant device 320 is recorded as a coordinate point in the virtual coordinate space, relative to the defined origin. The merchant device 320 identifies any products present at each location.

In some implementations, a product may be identified by the merchant device 320 reading a machine-readable indicia/code (e.g. barcode or QR code) for each product. The machine-readable code uniquely identifies the product, and the location of the merchant device at the instance of reading the code may be used as the location of that product. For example, if Merchant Jane's merchant device 320 is at virtual coordinate (235, 456, 10) of Jane's Menswear retail store when the merchant device 320 scans the barcode of men's blue jeans, then the location of the men's blue jeans in the store is captured as coordinate (235, 456, 10). Instead of a machine-readable code, other technology may be used instead. For example, each product may include an RFID tag, such as RFID tag 344 of product 342. The merchant device 320 may include an RFID reader that receives the digital data transmitted by the RFID tag. The digital data from the tag uniquely identifies the product, and the location of the merchant device 320 at the time of reading the RFID tag is used as the location of that product. If the merchant device 320 is able to estimate its distance from the RFID tag (e.g., using received signal strength of the signal received from the RFID tag), then the estimated distance measurement may be used to refine the accuracy of the (x, y, z) location coordinate assigned to the product.

In some implementations, the virtual coordinate space is two dimensional and the height at which a product is located is not captured.

In the example above, the physical location of the merchant device 320 needs to be tracked so that the physical location can be mapped to a virtual location coordinate, e.g. based on a physical displacement from the initial location. A non-exhaustive list of example ways to determine the physical location of the merchant device 320 include:

- An indoor positioning system (IPS), e.g. through the use of triangulation.
- GPS.
- Beacon technology. For example, beacons, such as beacon 346 in retail store 340, may be placed all around the store. When merchant device 320 enters the region of a particular beacon 346, the merchant device receives the signal transmission from that beacon, e.g. via Bluetooth™. The signal transmitted from that beacon includes the identifier of that beacon. There is a predefined mapping of beacon identifiers to physical locations in the store.
- Computer vision, which may be in combination with other sensors on the merchant device.
- Various of the above example ways in combination, such as, for example to improve accuracy.

For example, the use of computer vision may be implemented as follows. As the merchant device 320 moves, the camera of the merchant device 320 continually captures images. The captured images are analyzed to track a change in camera position from one image to the next. For example, each image may be analyzed to look for feature points in the image, such as surfaces, edges, and/or objects. The identified feature points may be used to determine a position relative to those feature points, and to determine how that position changes from one image to the next. Other information may also be used to track the change of position from one image to the next, such as: orientation and/or rotational data from an accelerometer and/or gyroscope; merchant-supplied information (e.g. known physical dimensions of shelves, bins, and other fixed items), etc. The tracked change in position may be measured in relation to the origin point.

In another implementation involving computer vision to determine the location of the merchant device 320, images of the physical retail store 340 captured in a real-time scan using the merchant device 320 may be compared to images of a previously conducted image scan of the store. For example, an augmented reality (AR) framework may be used to perform a full scan of the physical retail store 340 using depth, surface, and location information captured using the merchant device's camera feed and/or a light detection and ranging (LiDAR) sensor. The images of the real-time capture may be compared to locations within the store, known from the previous in-depth scan. Comparing real-time captured images to previous in-depth scan images stored in memory, instead of comparing to images captured earlier in a real-time stream, may reduce the time and processor requirements of the system.

In another embodiment, the location of the products in the retail store may be recorded and saved as product inventory and location data 311 in memory 308 of the store routing engine 302 using unique identifiers assigned to display or storage units within the physical retail store 340. The display or storage unit where a product is located may be known, and a mapping may associate each product with the unique identifier of the display or storage unit in which or on which that product resides. Instead of storing an (x, y, z) coordinate location of each product, as in some embodiments explained earlier, a shelf, rack, or bin number may be stored in the product inventory and location data 311. A map of the retail store 340 may also be stored that documents the physical location of each unique display and storage unit. For example, the display unit in which the men's blue jeans are located may be identified as shelf 1037, so the location data relating to men's blue jeans may be stored using the identifier 1037.

In yet another embodiment, physical layout of the store and/or product location in the store may be relatively static, such that a detailed model of the store and product locations may be predefined, e.g. at the time of store creation. The model may be 2D or 3D. The model and product locations may be generated based on the methods of any of the embodiments described above, or instead based on another method, such as manual entry of the product inventory and location data 311 in the memory 308 of the store routing engine 302.

Defining the Model of Passable Areas

Step 504 of method 500 involves defining a model of passable areas, such as defining model 315 of passable areas for retail store 340. The determination of different routes (e.g. walkable paths) through passable areas of the retail store 340 is used to direct a user to a target product and recommended products within the store 340.

In some embodiments, the passable areas of the store are partitioned into a plurality of segments, each segment representing a discrete area. A segment will be referred to as a cell. The cell size may be predefined and may be relatively small (e.g. 10 cm×10 cm). A cell may sometimes instead represent a 3D volume, e.g. a box in a 3D coordinate space. Wherever a cell is absent in the store layout model, it is assumed that that location cannot be traversed by a user, e.g. because of an obstruction, such as a shelf, or because the location is restricted or does not contain merchandise. Note that a "passable area", as used herein, encompasses a 2D area or a 3D area. For example, depending upon the implementation a passable area of the retail store may be a particular 3D volume of the retail store. As another example, depending upon the implementation, a passable area of the retail store may be a particular 2D region of floor space.

Each cell is associated with a location in the store, e.g. a virtual coordinate. For example, the virtual coordinate at the center of the cell may be defined as the location of the cell.

Figure 6:
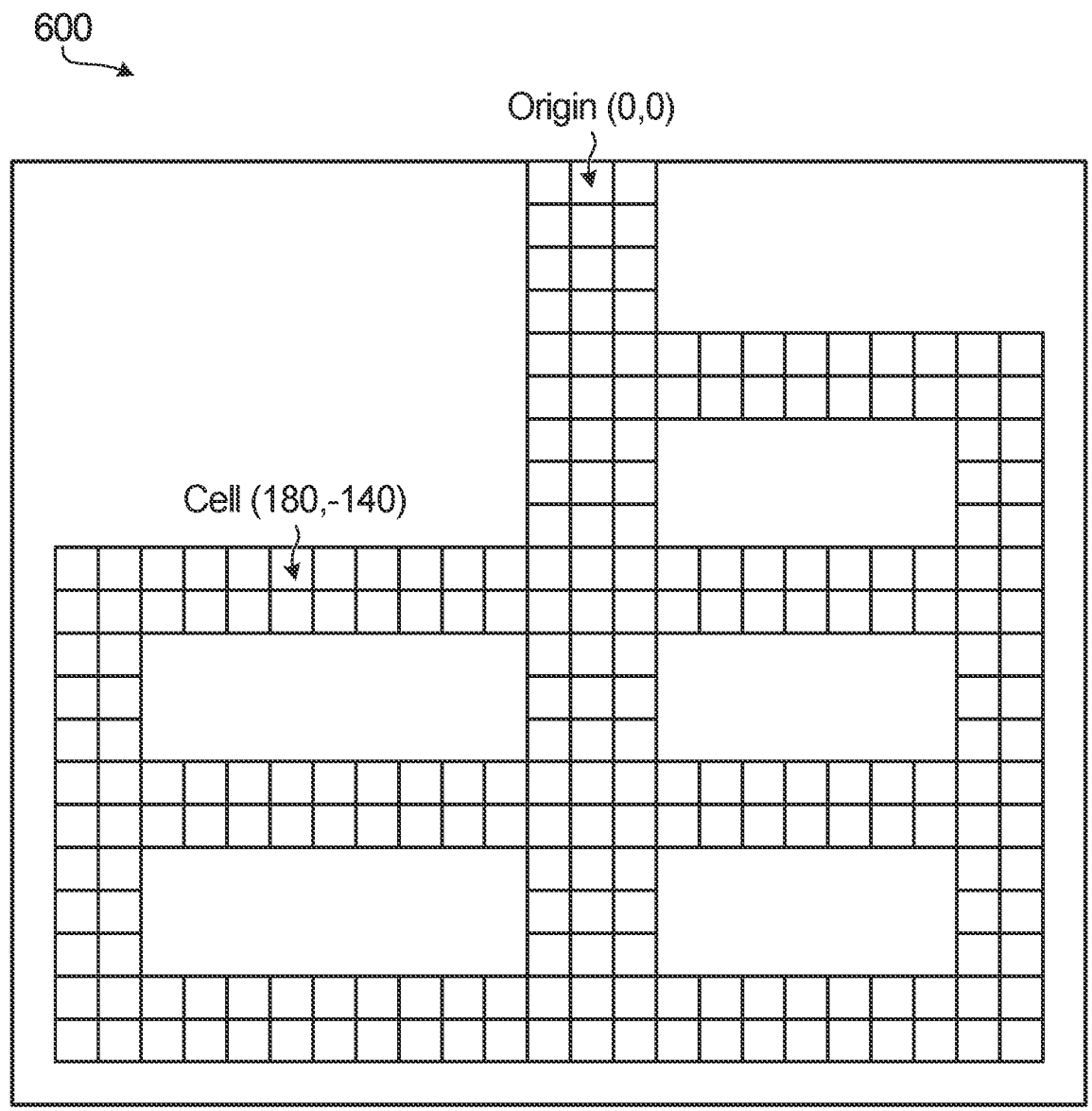
FIG. 6 illustrates a model of the passable areas in a physical retail store, according to one embodiment.

FIG. 6 is an example 2D model 600 of the passable areas in retail store 340, according to one embodiment. Model 600 maps the space of retail store 340 into a 2D virtual coordinate space. The retail store 340 may be Jane's Menswear, and the model 600 may have been established by the Merchant Jane using her merchant device 320. The model 600 may be stored as model 315 in memory 308 of the store routing engine 302. The virtual origin (0, 0) of the model 600 may represent the entrance of Jane's Menswear's physical retail store, and the cells appearing in the model 600 represent walkable paths in the store through which Jane has traversed. For example, illustrated cell (180, −140) in the model 600 represents a location within Jane's Menswear relative to the store's entrance. The space in model 600 without cells may represent areas in the store that do not contain merchandise, such as storage and display, a cash register area, fitting rooms, etc.

There are several ways in which the cells representing traversable areas may be mapped to the model of passable areas. Some of these methods are described as follows.

In an embodiment, a merchant traverses the physical retail store 340 with their merchant device 320 when scanning products, and the location of the merchant device 320 is assumed to be in a passable area. Cells may be populated at the locations through which the merchant device 320 moves, with the location of each cell being defined as the location of merchant device 320 at the time the cell is created.

Figure 7:
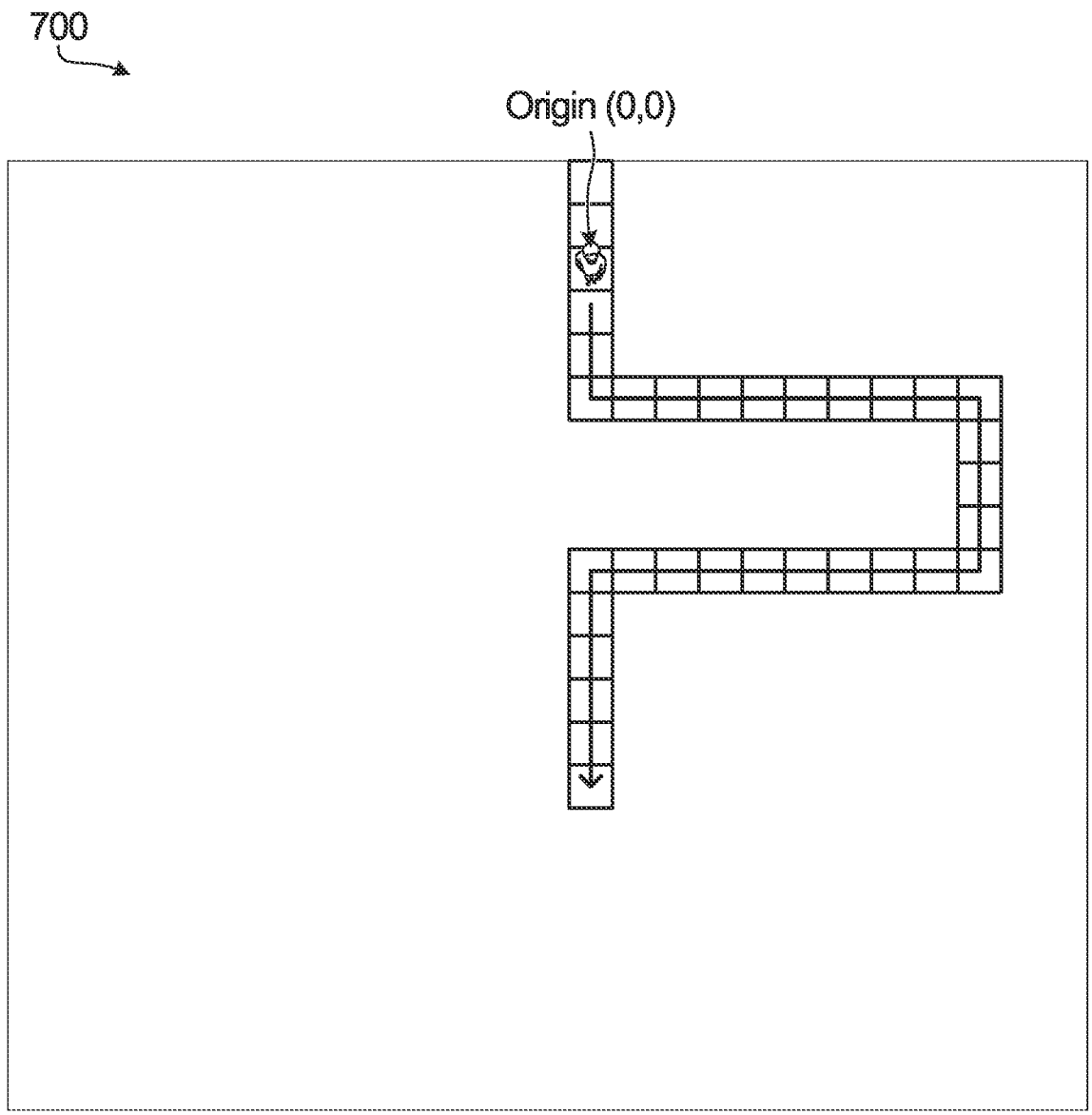
FIG. 7 illustrates an example of a merchant device navigating a virtual coordinate representation of passable areas in a physical retail store, according to one embodiment.

FIG. 7 is an example of a merchant device 320 navigating a virtual coordinate representation of passable area in physical retail store 340, according to an embodiment. Model 700 displays the merchant beginning at an origin point (0, 0), and traversing through the passable area of the store. The merchant's path is recorded by the merchant device 320 being held by the merchant and mapped as cells indicating passable area in the model 700.

The model 700 may assume that an area within the store that is not populated by cells is not a passable area. However, in some embodiments additional cells may be added as the merchant device 320 (or one or more buyer/visitor devices) move about the store, e.g. the merchant device 320 may keep tracking and adding cells over a long period of time as the merchant moves about the store in their daily activity.

In another embodiment, the cells in the model of passable areas 315 may be manually defined, e.g. based on a map of the store layout. For example, if the store layout is relatively static, a model may be manually created that indicates the unpassable areas based on the known locations of shelves, fitting rooms, etc. Cells of any desired granularity may be manually defined for passable areas.

In yet another embodiment, traffic patterns may be detected as people move throughout the store. For example, radar may be used to determine where people are moving. Areas where traffic is present are assumed to be passable areas and are partitioned into cells. Areas where traffic is absent are assumed to be unpassable/impassable areas. In general, passable areas may be inferred from unpassable areas or vice versa.

In yet another embodiment, the passable areas and/or unpassable areas might be determined by a customer device, e.g. user device 330. For example, user device 330 may be running the store's app, which relays information relating to the user device's location back to the store routing engine 302. A location of the user device 330 may be assumed to be a passable area of the retail store 340.

Identifying the User and Their Target Product

At step 506 of method 500, the store routing engine 302 identifies the user of user device 330, as well as the target product the user is seeking.

In one embodiment, the user accesses a software application ("app") using their user device 330 (e.g. using their mobile device). The app may be a web/browser-based app, a native app, or a hybrid app. The app may be specific to the merchant and/or associated with an e-commerce platform, such as e-commerce platform 100. The user provides their login details, which identifies the user (e.g. via the user ID). The user has a user profile stored in memory, such as user profile 309 in memory 308 of the store routing engine 302. The user profile 309 may include details about the user, including preferences, purchase history, browsing history, etc.

FIG. 8 illustrates an example user profile 309 for user "Fred", according to one embodiment. The user is assigned a unique user ID 57468556, which distinguishes the user from other users identified in the store routing engine 302. The user profile 309 may include information such as: personal information 802 (e.g. the user's name, age, user ID, etc.); and/or billing information 810 (e.g. the user's credit card information); and/or preferences 804 (e.g. the user's preferred colors, materials, products, interests etc.); and/or purchase history 806; and/or browsing history 808 (e.g. of products previously viewed on the merchant's website and/or on the website of other merchants on an e-commerce). For example, Fred's user profile indicates that his preferred material is flannel, and that he has recently purchased and browsed product web pages of flannel shirts. The information illustrated in FIG. 8 is only an example. Additional or different information may be included, e.g. information related to previous exchanges the user had with one or more merchants.

The purchase history 806 may be specific to retail store 340 and/or to the merchant associated with retail store 340. In some embodiments, the purchase history 806 of the user may be recorded for any purchase made from any merchant having a merchant account on or accessible to the store routing engine 302. In the example in FIG. 8, Merchant Jane is the merchant that runs retail store 340. The user Fred has previously purchased blue jeans and a flannel shirt from Merchant Jane. It is not indicated in FIG. 8 whether these previous products were purchased from Merchant Jane in retail store 340 or through another method (e.g. via Jane's online store). This indication may be included as part of the purchase history 806. In the example in FIG. 8, it is indicated in the purchase history 806 that user Fred previously purchased a wallet from another merchant (Merchant Kathy). In this example, Merchant Kathy has no relation to Merchant Jane, except that both merchants are registered with the store routing engine 302, e.g. both merchants have a merchant account on or accessible to the store routing engine 302. Merchant Jane might or might not have access to the purchase history related to Merchant Kathy, depending upon the permission settings. Similarly, browsing history 808 might be specific only to Merchant Jane, e.g. only include product views made by user Fred on Merchant Jane's website. Alternatively, browsing history 808 might also include the user's browsing history for the online store of other merchants.

The information stored in user profile 309 may be updated whenever user Fred performs an action that provides additional information about user Fred, e.g. when Fred makes additional purchases or performs additional online browsing. The user profile 309 may also be manually updated by user Fred, e.g. user Fred may manually update his preferences using a software app installed on or accessible via user Fred's user device 330.

Information about the user, such as information from user profile 309, may be used to determine recommended products, which may be used to determine the route the user is directed along to the target product.

Through the software application accessible via the user device 330, the user may be able to access the merchant's product inventory and location data 311 and view the products for sale in retail store 340. The user may select a target product based on the available inventory.

FIG. 9 illustrates an example of product inventory and location data 311 for retail store 340, according to one embodiment. The product inventory and location data 311 stored in memory 308 of the store routing engine 302 may be accessible to a user via the user device 330. Example fields that may be stored for each product in stock include: product name 902, product description 904, product ID 906 (e.g. product stock keeping unit (SKU)), quantity of product in stock 908, etc. Also stored is the location 910 of the product in the store 340. The location may be stored as an (x, y, z) coordinate in a 3D space of the retail store 340, as is the case in the example illustrated in FIG. 9. For example, FIG. 9 illustrates product inventory and location data of the products for sale in Jane's Menswear's retail store. The first product listed in the data are men's blue jeans, which are described by their material, color, and size. The product's associated SKU is listed as "JX1524BJ34", and the data indicates that there are four pairs in stock at the coordinate (235, 456, 10) in a 3D model of Merchant Jane's retail store.

Other ways of representing the location of each product may be used instead, e.g. by specifying a region in the store, a shelf number, a bin number, etc. If the same product is located in multiple locations in the store (e.g. some on the floor and some in the stock room), then there may be two separate entries in memory, e.g. as shown in the first two rows of the table in FIG. 9. The data in FIG. 9 may be updated as a product is sold, as a new product arrives, and if the location of a product changes. The details of the storage are implementation specific, and the table format in FIG. 9 is just one example.

Information about the user, such as information found in user profile 309, the target product, and the other products for sale in the retail store, such as the product inventory and location data 311, may be used to determine one or more recommended products. The route guidance may then be influenced by the target and recommended products.

Determining One or More Recommended Products

Passable areas in the physical retail store 340 are determined at step 504 of method 500, and there may be multiple routes through the passable areas that can be taken to reach a target product. The specific route along which the store routing engine 302 may direct the user may be influenced by the location of a recommended product.

Step 508 of method 500 involves determining one or more recommended products. Information associated with a user stored in the user profile 309 and product inventory and location data 311, along with recommendation rules 313, may be used to recommend products that the user may be interested in purchasing.

For a particular user, a product may be recommended based on factors such as: user specific criteria, and/or the target product, and/or criteria indicated by the merchant.

User-specific criteria may be determined based on the user profile 309 associated with the user stored in memory 308 of the store routing engine 302. The user profile, such as profile 309 of FIG. 8, may include a user's preferences, purchase history, browsing history, etc. For example, if the purchase history of the user shows that they purchase shoes with high frequency, then shoes may be a recommended product. As another example, if the online browsing history of Fred on Jane's Menswear website indicates that Fred viewed a particular black flannel shirt sold by Jane's Menswear, then that black flannel shirt may be a recommended product.

The target product, as determined at step 506 of method 500, may also or instead be used by the store routing engine 302 to determine a complementary recommended product. For example, if Fred's target product is men's blue jeans, then a leather belt, which is typically worn with jeans, may be determined to be a recommended product.

As well, criteria indicated by the merchant may also or instead be used by the store routing engine 302 to determine recommended products for a user. Regardless of the specific user and/or target product, the merchant may define one or more recommended products. These recommended products may be products that the merchant wishes to sell or highlight to any user who enters their physical retail store 340. For example, a merchant may recommend products on discount or clearance, seasonal products, or any products that the merchant may wish to clear out of the store's inventory, such as last year's models or dead inventory.

In some embodiments, recommendation rules are defined and used to recommend a product. These recommendation rules may be recommendation rules 313 stored in memory 308 of the store routing engine 302. A recommendation rule may be a unit of decision-making logic that recommends a particular product or product type or category when certain conditions are met. A recommendation rule may be in the form of an "if-then" statement. Some recommendation rules may be based solely on the target product, e.g. "if target product is men's blue jeans then recommend belts". Some recommendation rules may additionally or alternatively be based on user-specific information in the user profile 309 associated with the user, e.g. "if user previously purchased men's dress shirt then recommend ties" or "if target product is dress shoes and user previously purchased men's dress shirt, then recommend men's dress pants". Some recommendation rules may additionally or alternatively be based on the user's purchase and/or browsing history and products purchased by other users with similar purchase and/or browsing history, e.g. "if users who viewed a green flannel shirt eventually purchased a black flannel shirt in Jane's Menswear retail store, then recommend the black flannel shirt to a user who viewed the green flannel shirt". The use of collaborative filtering and other like approaches may be used to generate such a recommendation rule. Some recommendation rules may additionally or alternatively be based on merchant-defined rules, e.g. "if socks on clearance then recommend socks" or "if target product is product category outerwear, then recommend outdoor sports equipment currently on discount" or "if target product is dress shoes and user previously purchased men's dress shirt, then recommend J. K. Renold dress pants" (e.g. because this brand of dress pants has a high profit margin for the merchant).

A recommendation rule may be generated in different ways, depending upon the implementation. For example, a recommendation rule may be custom-created by a merchant, e.g. using the user interface 328 of merchant device 320. As another example, a recommendation rule may be added for the merchant based on recommendation rules used by other merchants that resulted in a positive outcome for those other merchants (such as a high sales conversion). These recommendation rules may be determined using aggregate data associated with similar products, product categories, or other products used within the same industry as the target product. The aggregate data may be collected from several merchants using the application associated with the store routing engine 302. The several merchants may be on a same e-commerce platform, e.g. e-commerce platform 100, and the store routing engine 302 or another application on the e-commerce platform may collect the aggregate data and determine one or more recommendation rules from the aggregate data. As another example, a recommendation rule may be manually provided by an expert in the field of the target product, such as a fashion expert for product recommendations in an apparel store.

Guiding the User Along a Determined Route

Step 510 of method 500 involves guiding a user along a route influenced by the one or more recommended products. The processor 304 of store routing engine 302 may determine a route to guide the user through retail store 340 to reach a target product, and present the route guidance to the user in real-time at the user interface 338 of the user device 330. Directing the user to the target product may begin at an initial location outside the store, e.g. beginning from the user's home if the user is at home when accessing the app. However, in any case, once the user is inside the retail store 340, there may be multiple routes from that location inside the retail store 340 to the target product. The routes to reach the target product may include routes that pass by one or more recommended products in the retail store 340 without extending the route too far beyond the shortest path from the user's current location to the target product.

In some embodiments, each cell of the passable areas is assigned a cost value, and a route may be selected as the route that minimizes cost. Alternatively, instead of minimizing cost, a route may be selected as the route that causes cost to be below a threshold or be lower than the cost of one or more alternative routes to the target product. In some embodiments, an algorithm such as the A* ("A-star") algorithm may be implemented to determine the most optimal path in the sense of minimizing the cost. The A* algorithm is a graph traversal and path search algorithm known in the art. The A* algorithm finds paths available from a designated origin point (e.g. the location of the user) to a destination (e.g. the target product) and then determines the most optimal path of all of the determined paths in the sense of minimizing the cost.

Figure 10:
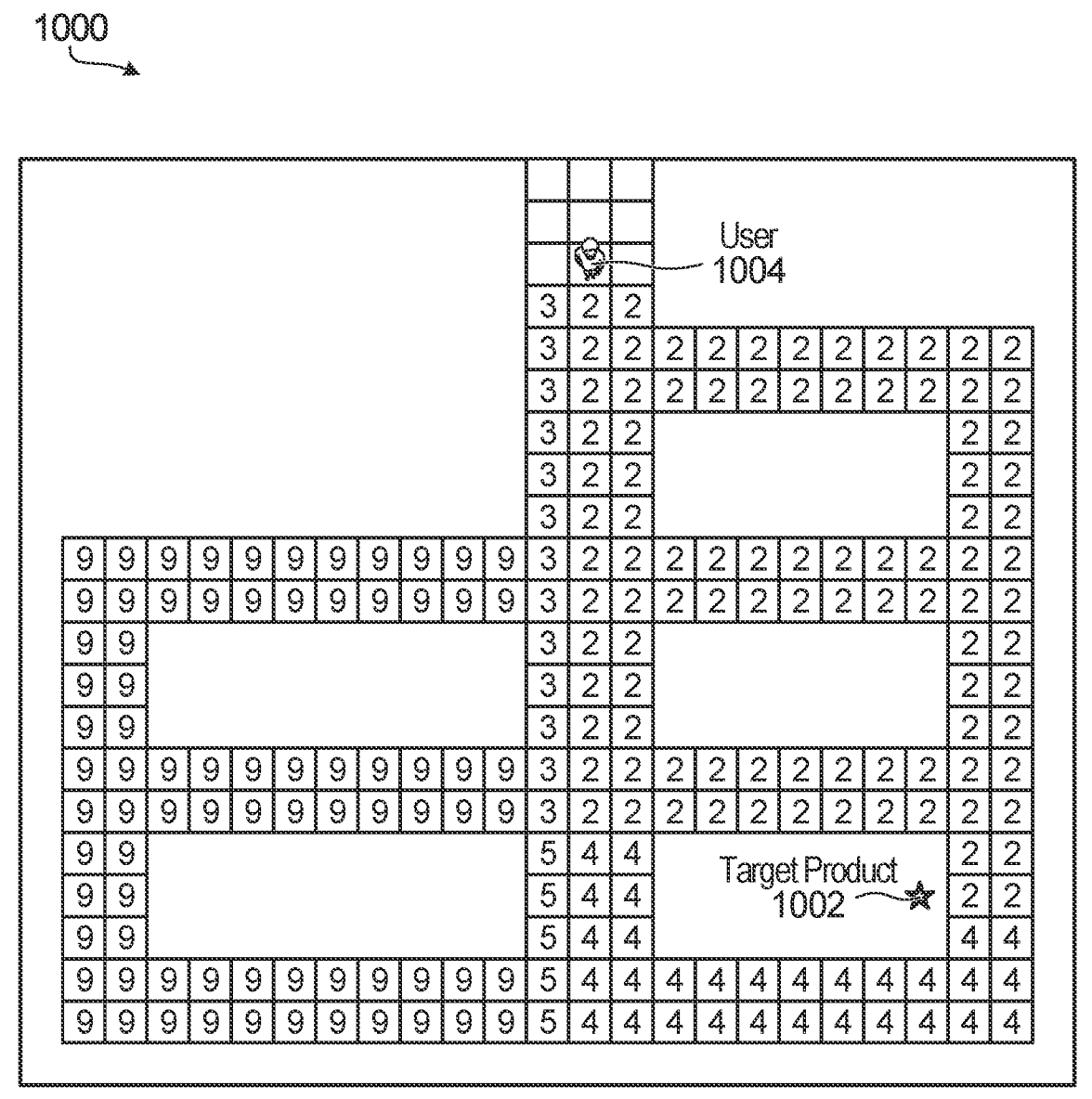

The default may be to assign cost values to cells so that the shortest path has the lowest cost (on the assumption that the user would want the shortest route possible to the target product). FIG. 10 is an example of a model 1000 of passable areas with cost values assigned to cells. Model 1000 shows a 2D model of passable areas 315 of the physical retail store 340, which includes the location of a target product 1002 within the store and the current location of a user 1004. Each cell within model 1000 is assigned a cost value between 1 and 10, where the value 10 is the highest cost. For example, model 1000 may be a model of Jane's Menswear retail store, in which Fred is searching for his target product of men's blue jeans. Model 1000 displays Fred's location at the store entrance, the location of the men's blue jeans, and the cost associated with traversing through each cell of the physical retail store 340 in order to reach the target item.

Figure 11:
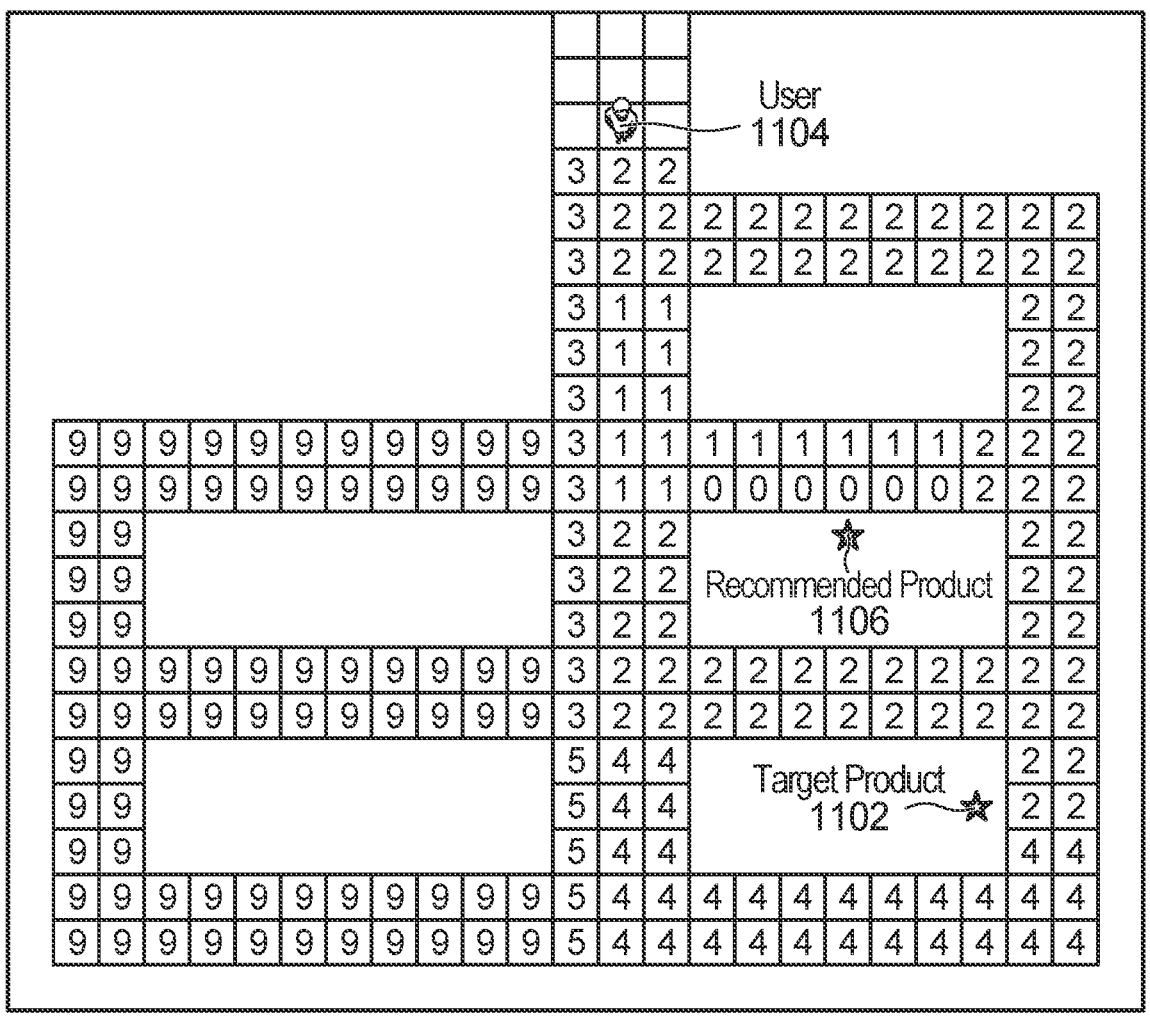

However, in some implementations, the cell cost values may be assigned or weighted differently to favor routes that pass by one or more recommended products. FIG. 11 is an example of a model 1100 of passable areas with cost values assigned to cells, in which the cost values are influenced by a recommended product. Model 1100 shows a model of passable areas of the retail store 340 including the location of target product 1102, the initial location of the user 1104, and the location of the recommended product 1106. Relative to model 1000 of FIG. 10, the cell cost values near the recommended product 1106 have a lower associated cost, e.g. a value of 0 or 1 vs. 2, making it more likely that the user will be guided down the aisle having the recommended product 1106 because doing so results in a route that minimizes or reduces cost compared to alternative routes to the target product 1102. For example, model 1100 may be a real-time model used to instruct Fred via user device 330 to direct him towards men's blue jeans in Jane's Menswear, shown as target product 1102. The store routing engine 302 may determine that a blue flannel shirt is a recommended product, shown as recommended product 1106 in FIG. 11. The product inventory and location data 311 is used to determine the location of the recommended product 1106. Model 1100 provides costs associated with traversing through the passable areas within Jane's Menswear retail store, and reduces the cost of walking down the aisle with the blue flannel shirt en route to the men's blue jeans.

Figure 12:
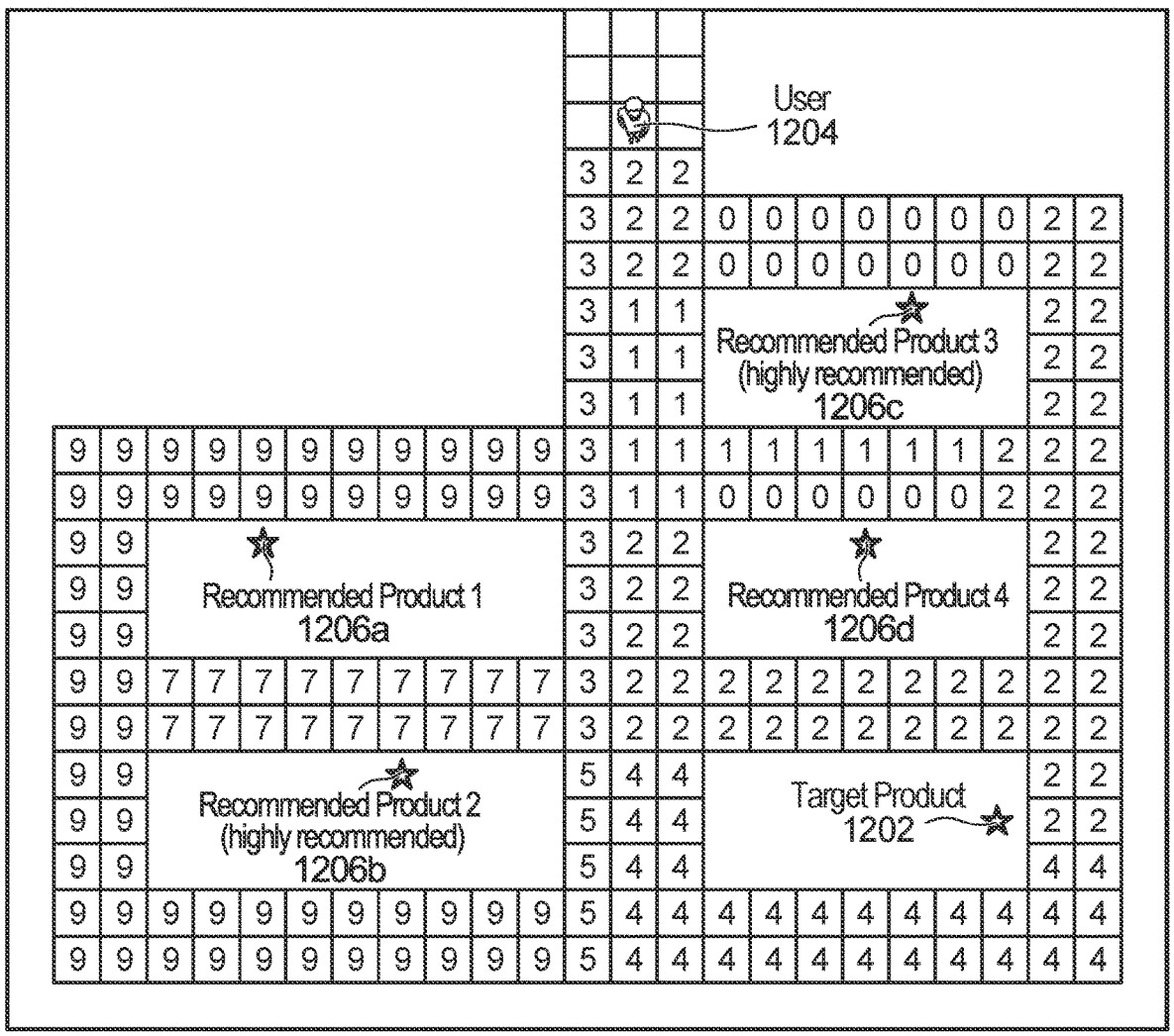

The cost value of cells around each recommended product may also or instead be assigned based on strength/category of the recommendation and/or whether the recommended product is on a shortest path. For example, FIG. 12 is an example of a model 1200 of passable areas with cost values assigned to cells, in which there are multiple recommended products, each at a different location. The location of each recommended product (as well as the location of the target product) may be determined from product inventory and location data 311. Model 1200 includes a model of passable areas 315 within the retail store 340 including the location of target product 1202, the initial location of user 1204, and the location of four recommended products 1206a to 1206d. Recommended products 1206b and 1206c are considered to be "highly recommended", such that the cost value associated with the cells nearby these products is lower than the cost of these cells in the models of FIGS. 10 and 11, and lower than the value that may be assigned if the product was recommended but not "highly recommended".

Recommended products 1206a and 1206d are categorized as "normal recommendations".

A "highly recommended" product may be a product that satisfies multiple conditions (e.g. multiple recommendation rules). For example, a "highly recommended" product may be a product that is recommended because of the user's past purchase history and target product and merchant criteria (e.g. shoes are highly recommended if the user purchases shoes on a frequent basis and the target product is a purse and the shoes are on sale).

Recommended product 1206a is not on a shortest (or relatively short) path to the target product 1202, and the category of recommendation is "normal". Therefore, the cost values assigned to the cells around recommended product 1206a are not changed. Recommended product 1206b is also not on a shortest (or relatively short) path to the target product 1202, but the cost value assigned to the cells around recommended product 1206b is still lowered because the category of recommendation is "highly recommended". The cells leading down the aisle of recommended product 1206d are reduced in cost, but not as much as the cells leading down the aisle of recommended product 1206c because recommended product 1206c is highly recommended.

For example, Fred may be searching for men's blue jeans in Jane's Menswear retail store, and the store routing engine 302 may recommend the products: a blue flannel shirt, a brown leather belt, a green plaid shirt, and a white t-shirt. The blue flannel shirt and brown leather belt may be "highly recommended" products 1206b and 1206c, based in part using information about Fred's preferences found in user profile 309. The store routing engine 302 may assign low cost values to traversing the cells nearby the blue flannel shirt and brown leather belt en route to the men's blue jeans.

Although not illustrated, in some embodiments, the cell cost value may increase along routes that do not have a recommended product and/or along routes that include products determined to be less desirable to show the user (e.g. if the product has low inventory and/or the product does not complement the target product and/or it is predicted that the user would not be interested in the product, e.g. because the user just recently purchased that product).

In some embodiments, an additional check may be implemented to constrain the overall physical route distance to a maximum deviation from the shortest possible route to the target product (e.g. increased route distance cannot be more than 10% or 1 extra minute of walking time as compared to the time/distance of the shortest route to the target product). In such embodiments, the minimum cost route may be rejected and a higher cost (but physically shorter) route may ultimately be selected by the algorithm for presentation to the user.

To guide the user, the physical location of the user in the store needs to be determined. The location of the user device 330 may be used as the location of the user, and the same methods described above in relation to the merchant device 320 may be implemented to track the location of the user device 330, e.g.: an indoor positioning system (IPS), and/or GPS (if applicable), and/or beacon technology and/or computer vision. In terms of computer vision, in one embodiment the merchant may prepopulate a database of digital images of the retail store 340 and associated physical locations, and use the data to train a computer vision algorithm, e.g. using machine learning. The trained computer vision algorithm may then accept an image of the store captured by the camera of the user device 330 and return a decision as to the location of the user device 330 in the store.

The location of the user device 330 may be mapped to the same virtual coordinate system as defined by the merchant. For example, the user may scan a QR code or barcode at one or more fixed locations to associate the user device 330 with a particular virtual coordinate, and any subsequent movement of the user device 330 is measured in relation to that virtual coordinate to track the location of the user in the virtual coordinate space.

Assigning different cost values to different cells is only one example implementation. Other implementations are possible. For example, each recommended product may be associated with a particular aisle, shelf, or bin number. If a store layout model reveals that that particular aisle, shelf, or bin number displaying a recommended product is interposed between the user and the target product, then the user is led past that particular aisle, shelf, or bin number.

The actual route guidance may be provided to the user via the user interface 338 of user device 330 by displaying directions, and/or audibly announcing such directions, and/or possibly using augmented reality (AR) or mixed reality (MR). In some embodiments, displaying directions on the user device 330 may be achieved through an indoor map version of or akin to Google Maps™ visual navigation directions (or the like) and/or by providing text direction on the user interface 338, such as "Turn left". For example, a visual guide, such as an arrow, may be displayed on the screen of the user's device 330, e.g. superimposed on top of the image captured by the camera of the user's device 330. For example, if the user device 330 is an AR device such as AR glasses worn by the user, the arrow may be displayed as a digital AR object on the AR glasses. As the user walks along the route, the direction of the arrow is updated.

Figure 13:
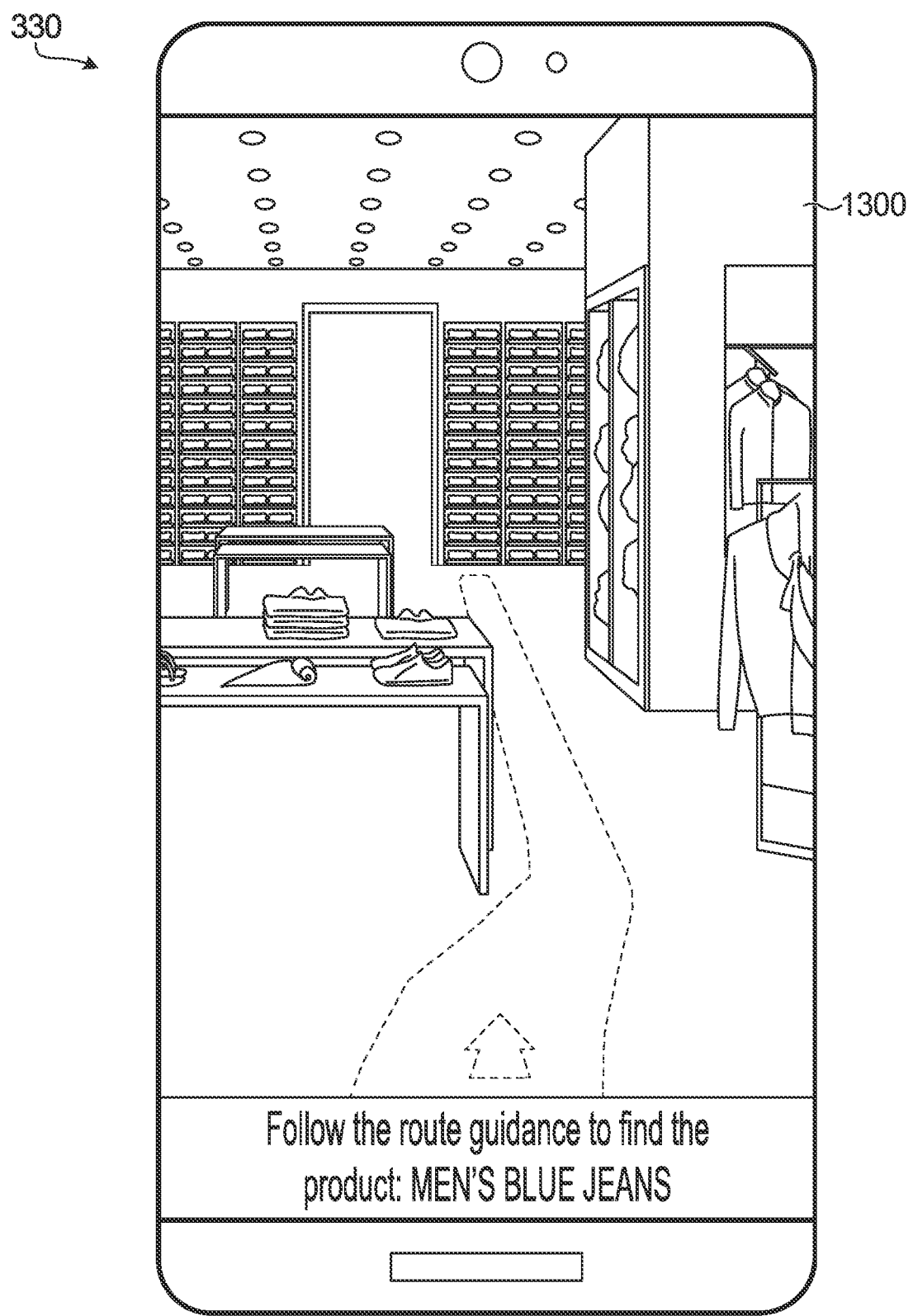
FIGS. 13 and 14 are user interfaces of the user device providing the recommended routes using augmented reality (AR) or mixed reality (MR), according to some embodiments.

FIG. 13 is the user interface 338 of the user device 330 providing the recommended routes using AR (or a variant thereof, such as MR), according to one embodiment. The user interface 338 of the user's user device 330 includes a display 1300 that provides the user with real-time guidance along a route, where an arrow directing the user is superimposed on top of the image captured of the physical retail store 340. For instance, display 1300 on user device 330 belonging to user Fred may be used to guide Fred to his specified target item. Display 1300 may include an image capture of Jane's Menswear retail store 340, with arrows as digital AR objects directing Fred to the location of the men's blue jeans.

In some implementations, when the user is walking past a recommended product, a message may be presented at the user interface 338 of the user device 330 that brings the user's attention to the recommended product, e.g. a visual or audible message (e.g. "Note that our shoes are on sale this week"). In some implementations, a haptic notification may be provided to the user in addition to the visual and/or audible message.

Figure 14:
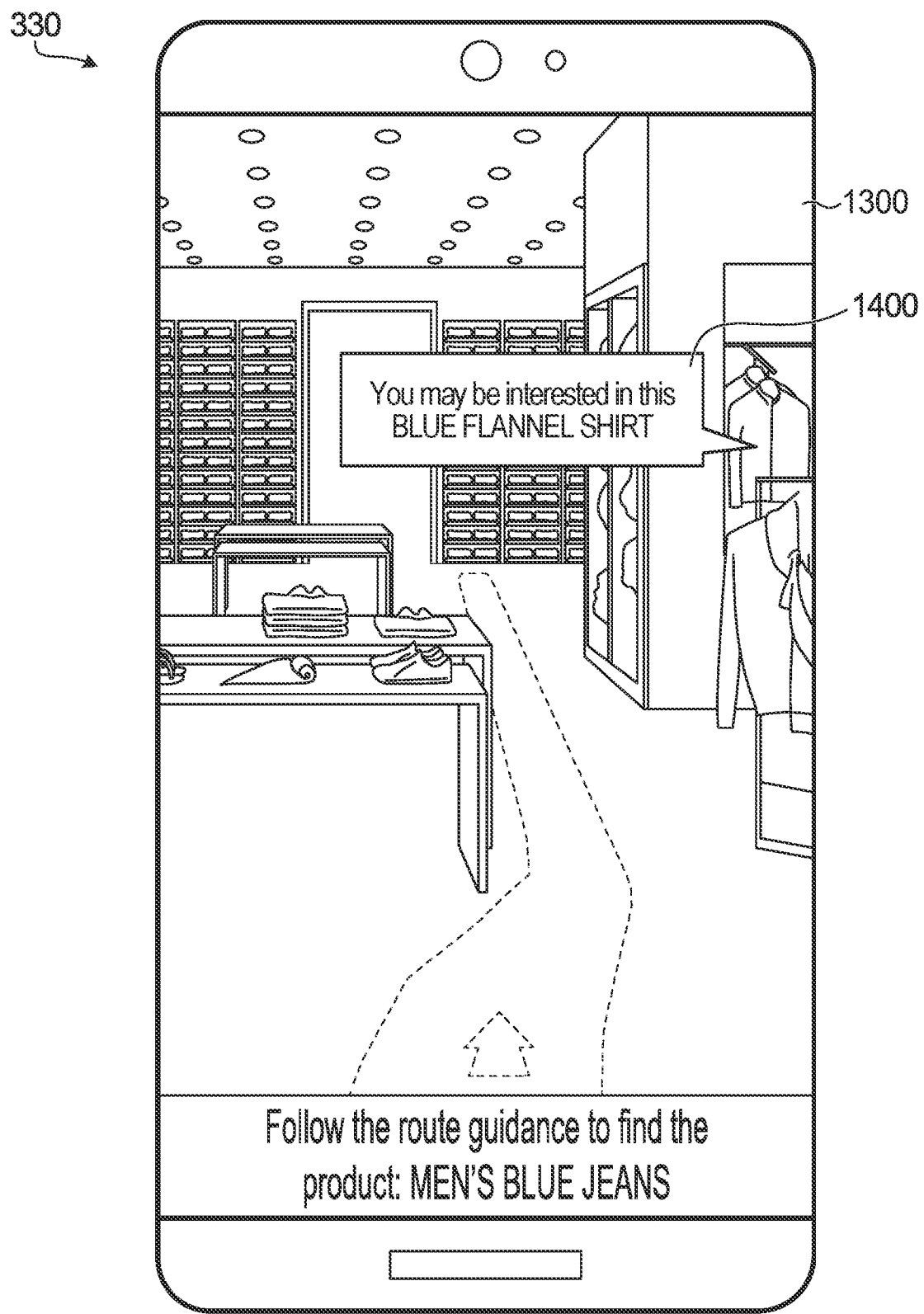

FIG. 14 illustrates a variation of FIG. 13 in which a recommended product is highlighted, according to one embodiment. Like in FIG. 13, display 1300 in FIG. 14 provides an image captured by the camera of user device 330 and displayed through user interface 338. However, FIG. 14 also includes visual message 1400, which indicates that the user is passing by a recommended product. For example, display 1300 shown on Fred's user device 330 may show route guidance in Jane's Menswear retail store 340. The recommended route to the target product, men's blue jeans, may involve passing by one or more recommended products, such as the blue flannel shirt. Display 1300 notifies Fred that he is passing by a recommended product through the use of visual message 1400, which states "You may be interested in this BLUE FLANNEL SHIRT". In some embodiments, the message 1400 may include a hyperlink that, when selected by Fred through user interface 338, retrieves and displays a webpage providing product information relating to the recommended product.

Additional Methods

Further example method steps are described below in order to supplement and/or further detail some of the explanation above. Not all of the steps described below are necessary in all embodiments. Also, some of the steps may be substituted by other steps instead. In the examples below, the merchant is assumed to be Merchant Jane introduced earlier. Merchant Jane is running the physical retail store 340 Jane's Menswear and uses merchant device 320. The person visiting the store is assumed to be user Fred introduced earlier, having user device 330 and having user profile 309 shown in FIG. 8.

Figure 15:
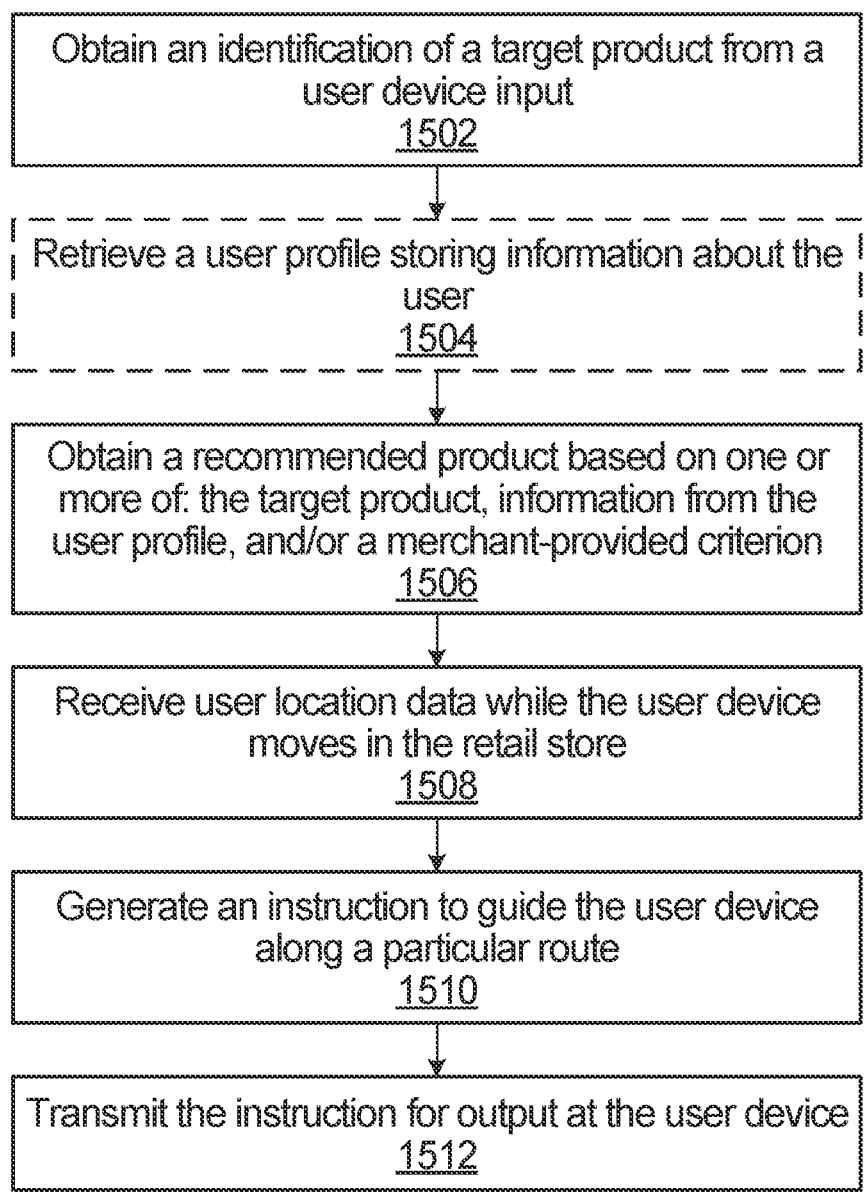
FIG. 15 is a computer-implemented method, according to one embodiment.

FIG. 15 is a computer-implemented method 1500, according to one embodiment. The method may be performed by a computing device, e.g. the store routing engine 302. In method 1500 of FIG. 15, the steps are described as being performed by the processor 304 of the store routing engine 302, but this is only an example. For example, the method may instead be performed by another entity, which might or might not be part of an e-commerce platform.

At step 1502, the processor 304 obtains an identification of a target product from a user device input. The target product is for sale by a merchant (e.g. Merchant Jane) in a retail store (e.g. retail store 340). The identification of the target product originates from input at a user device. For example, the processor 304 of the store routing engine 302 obtains the identification of the target product based on an input through the user interface 338 of user device 330, where the target product may be a product stored in the product inventory and location data 311. For example, Fred may enter Jane's Menswear retail store 340 and enter his target product as "men's blue jeans" through a software application on his user device 330. The store routing engine 302 may then identify the men's blue jeans as the target product.

In some implementations, step 1502 may instead involve identifying a target location in a physical retail store 340, rather than identifying a target product. For instance, the user may wish to find a customer service desk within the retail store, or a particular section of the store. As an example, user Fred may wish to find the "casual wear" section in Jane's Menswear retail store 340. Fred may enter this section as his target location in the retail store 340 through the software application on his user device 330.

At step 1504, the processor 304 of the store routine engine 302 retrieves a user profile associated with the user device. The user profile stores information about the user. For example, the processor 304 of the store routing engine 302 may determine a user profile 309 stored in memory 308 associated with a user device 330 of a visitor to the physical retail store 340. For example, user Fred may be logged in to a software application associated with Jane's Menswear retail store on his user device 330, which then retrieves Fred's user profile 309. Fred's user profile includes personal information 802, preferences 804, browsing and purchase history 808 and 806, and billing information 810. For example, Fred's user profile 309 indicates that Fred prefers the color blue and has recently purchased a green flannel shirt.

Alternatively, step 1504 might not be performed in some embodiments of method 1500, and the processor 304 of the store routing engine 302 may carry out the operations of determining recommended products and a subsequent recommended route without particular knowledge of the store's visitor.

At step 1506, a recommended product is obtained based on one or more of: the target product, information from a profile associated with the user device, and/or a merchant-provided criterion. In some embodiments, the processor 304 of the store routing engine 302 may determine recommended products using information relating to the user's preferences 804 and/or browsing and/or purchase history 806 and 808, such as the information from user profile 309 in FIG. 8. Recommended products may also or instead be determined based on the target product, e.g., items that are typically used together, and/or based on criteria set by the merchant, e.g., the merchant may recommend items based on their desire to move inventory. Recommendation rules 313 may be used in conjunction with the determined criteria to recommend a particular product, product type, or category when certain conditions are met. For example, processor 304 in store routing engine 302 may recommend a blue flannel shirt to merchant Fred based on information from his user profile 309, which indicates his preference for the color blue and flannel material, and his target product, men's blue jeans, which he may want a new shirt to match.

Steps 1508 to 1512 are then performed as the user device moves in the retail store.

At step 1508, user location data is received while the user device moves in the retail store. The user location data indicates a location of the user device. The user location data may be determined via wireless communication between the user device 330 and the store routing engine 302 using one or more of the location determination methods described earlier, e.g. IPS, GPS, and/or beacon technology, such as beacon 346.

At step 1510, an instruction to guide the user device along a particular route is generated, e.g. based on the user location data and/or a location of the target product and/or a location of the recommended product. In some embodiments, the processor 304 of store routing engine 302 determines one or more recommended routes that may pass by one or more recommended products in the retail store 340 based on the current location of user device 330. The particular route may be generated using a model of passable areas 315 in the physical retail store 340, where cells are used to indicate passable areas, and the determination of an optimal path from a user device's origin location to the location of a target product in store. For example, store routing engine 302 may determine a route to direct Fred to the men's blue jeans based on the current location of Fred's user device 330 in Jane's Menswear retail store 340. The generated instruction or instructions may guide Fred directly to his target product, e.g., the route shown in FIG. 10, and/or may guide Fred past products recommended for Fred, such as the blue flannel shirt, brown leather belt, etc., such as the routes of FIGS. 11 and 12.

At step 1512, the instruction generated in step 1510 is transmitted for output at the user device. For example, the store routing engine 302 transmits the route guidance instructions to the user device 330 to provide the user with real-time instructions to find a target product within the retail store 340. The instruction may be presented through the user interface 338 on the user device 330 using visual navigation directions and/or text directions, and may use AR technology. The transmitted instruction may further include visual and/or audio and/or haptic feedback to inform the user that they are passing a recommended or target product. For example, FIGS. 13 and 14 show an AR image scan of a retail store, such as Jane's Menswear, on a user device 330, such as a user device belonging to Fred. An arrow is provided on the interface to guide Fred in the direction of his target product, men's blue jeans. In FIG. 14, a visual message 1400 is provided to Fred to indicate that he is passing by a recommended product.

In some embodiments, the particular route determined in step 1510 may be associated with a plurality of contiguous segments stored in memory. In some embodiments, each segment of the contiguous segments may correspond to a respective different passable area of the retail store. Each segment may be assigned a respective cost value. As well, method 1500 may further include generating a plurality of instructions that guide the user device along the particular route based on a comparison of cost values between segments of alternative routes to the target product. For example, an algorithm, such as the A* algorithm described earlier, may be used to evaluate cost values assigned to segments (cells) in a model of passable areas 315 in order to determine an optimal path from the user device's location to the target product. A route may be chosen that reduces or minimizes cost compared to other routes to the target product. Determining the chosen route may be performed by comparing cost values between alternative routes to the target product. An example of a model of passable areas, where segments have assigned cost values, is shown in FIG. 11. The model 1100 of FIG. 11 indicates the cost of traversing through passable areas of a store en route to a target product. The route passing by the recommended product 1106 has a lower cost compared to alternative routes that do not pass by recommended product 1106.

In some embodiments, each segment is assigned the respective cost value based at least on the location of the target product. The algorithm applied to the model of passable areas 315 may assign cost values, such that segments that bring the user nearer to the target product have a lower associated cost. For example, in FIG. 10 the segments to the left of the user 1004 are assigned a cost value of 3, whereas the segments to the right of the user 1004 are assigned a cost value of 2, because the target product 1002 is located to the right of the user 1004.

In some embodiments, the cost value of at least one of the segments is based on both the location of the target product and the location of the recommended product. The processor 304 of the store routing engine 302 may execute the algorithm such that it incorporates product recommendation information to determine the cost value of a particular segment. For instance, a segment directly in front of a recommended product may be assigned a lower cost value than the same segment would be assigned if the recommended product was not present at this location, even if it does not lie on a direct path between the user's current location and the target product location. For example, the model of passable areas in FIG. 12 includes the cost associated with each segment, where the costs are influenced by the location of recommended products. The segments directly in front of recommended product 1206c are assigned the cost value 0, as they pass by the recommended product and do not require the user to deviate from a short path to reach target product 1202. The reduced cost of traversing through segments near the recommended products provides incentive (e.g. in the sense of lowering overall cost) for the store routing engine 302 to direct the user device 330 past the recommended product.

In some embodiments, the particular route along which the user device is guided passes through a set of segments each having cost values lower than the cost values of alternative segments on the alternative routes, where the set of segments includes the particular segment. In some embodiments, the recommended product may be in proximity to the particular segment and the cost value of the particular segment may be lower than if the recommended product was not in proximity to the particular segment. For example, the models of passable areas of FIGS. 10 and 11 are models of the same physical retail store 340. The segment in front of recommended product 1106 in model 1100 is assigned a cost value of 0. However, the same segment is assigned a cost value of 2 in model 1000, where the recommended product is not present.

In some embodiments, the recommended product is a first recommended product, and method 1500 further includes obtaining a second recommended product based on one or more of: the information from the profile associated with the user device, the target product, and/or a criterion provided by the merchant. The method may further include assigning a first cost value to a first segment based on both the location of the target product and the location of the first recommended product; and, assigning a second cost value to a second segment based on both the location of the target product and the location of the second recommended product. In some embodiments, the first cost value may be assigned a different value than the second cost value based on: (i) the first recommended product being in a different category than the second recommended product; and/or (ii) the first recommended product being on a first path to the target product that is shorter than a second path to the target product on which the second recommended product is located. For example, the processor 304 of the store routing engine 302 may recommend a second product based on the target product identified in step 1502, information stored in user profile 309 retrieved in step 1504, and merchant-determined information, e.g. inventory that the merchant is incentivized to move. The first recommended product may be recommended product 1206c and the second recommended product may be recommended product 1206a in model 1200 of FIG. 12. The first segment directly in front of the first recommended product 1206c may be assigned a cost value of 0 and the second segment directly in front of the second recommended product 1206a may be assigned a cost value of 9. The assigned cost value of the first segment may be lower than the cost of the second segment, as the first recommended product falls under the category "highly recommended" and the second recommended product falls under the category "normal recommendation". Alternatively and/or additionally, the assigned cost value of the first segment may be lower than the cost of the second segment because the first segment is located along a shorter path to the target product 1202. For example, the first recommended product may be the blue flannel shirt and the second recommended product may be the red plaid shirt. The blue flannel shirt may be more highly recommended to Fred based on information found on his user profile 309, and the blue flannel shirt may be located along a shorter path to the men's blue jeans from Fred's current location.

In some embodiments, the first cost value is assigned a different value than the second cost value based on the first recommended product being in a different category than the second recommended product, where the first recommended product belongs to a first category and the second recommended product belongs to a second category. In some embodiments, the first category may be that the recommendation is based on both the information from the profile associated with the user device and the target product. For example, the processor 304 of the store routing engine 302 may determine that two recommended products for Fred, whose target product is men's blue jeans, may be a blue flannel shirt and a red plaid shirt. The blue flannel shirt may be the product belonging to the first category, as the user profile 309 associated with user Fred indicates his preference for the color blue and flannel material, and such a shirt may match well with the men's blue jeans he is searching for in the physical retail store 340. In FIG. 12, the first recommended product may be considered to be "highly recommended" and have a lower associated first cost value. For instance, the blue flannel shirt may be recommended product 1206c in model 1200, where the cost of the segment in front of the product is 0. In contrast, the recommended product 1206a may be the red plaid shirt, where the cost of the segment in front of the product is 9.

In some embodiments, the second recommended product is in proximity to the second segment, and the second cost value of the second segment is the same as if the second recommended product was not in proximity to the second segment. For example, the red plaid shirt may be recommended product 1206a in FIG. 12. The cost of the segment directly in front of the product has an associated cost value of 9. FIG. 11 provides a model of the same physical retail store 340, in which the second recommended product has not been identified as a recommended product to the user. The cost value of the noted second segment is still 9.

In some embodiments, the method 1500 may further include obtaining at least some of the plurality of contiguous segments by monitoring movement of a merchant device through the retail store and mapping different physical locations of the merchant device to different segments. For example, determining the location of the products, including the target product, in the physical retail store 340 may involve the merchant traversing through the retail store with merchant device 320 to also determine a model of passable areas 315 within the store 340. The model of passable areas 315 may include segments, which are populated by the recognition of the merchant device 320 moving through an area having an associated location determined, e.g. by IPS, GPS, beacon technology, or computer vision techniques.

In some embodiments, the method 1500 may further include implementing the instruction guiding the user device as a visual guide in the form of an augmented or mixed reality digital image on a screen of the user device. The instruction output at user device 330 at step 1512 of the method may be provided as an AR image on the user interface 338, such as that shown in FIGS. 13 and 14. For example, the display 1300 on Fred's user device 330 may show an AR representation of Jane's Menswear 340 retail store, where an arrow is superimposed on top of the store image to provide guidance along a particular route to a target product, such as men's blue jeans.

In some embodiments, the method 1500 may further include determining that the user device is in proximity to the recommended product based on the user location data and the location of the recommended product, and in response to determining that the user device is in proximity to the recommended product, transmitting a message for output at the user device for drawing attention to the recommended product. For example, the user device 330 may communicate its location to the store routing engine 302 via wireless communications over network 310, where the location of the user device 330 in the retail store 340 may be determined, e.g. through IPS etc. The use of product inventory and location data 311 stored in the memory 308 of store routing engine 302 may be used to determine that the user device 330 is near the recommended product. A message indicating that the user device 330 is near a recommended product may be transmitted and displayed to the user via the user device's user interface 338, such as message 1400 in FIG. 14. For example, display 1300 of FIG. 14 may be an AR representation of Jane's Menswear retail store, in which Fred is searching for men's blue jeans. The instruction is guiding Fred along a route in the store and message 1400 may appear to inform him that he is passing by a product that may be of interest, the blue flannel shirt.

In some embodiments, the information from the profile associated with the user device includes purchase history of a user, and the recommended product is generated at least based on the purchase history. For example, a product may be recommended to user Fred based on the purchase history 806 saved in his user profile 309. Fred's purchase history 806 indicates that he has recently bought a green flannel shirt from Merchant Jane. As a result, the processor 304 of store routing engine 302 may recommend a product that is similar to the green flannel shirt, such as the blue flannel shirt, which he does not already own but is made of a similar fabric.

In some embodiments, the information from the user profile associated with the user device includes an indication of one or more products viewed online by a user, and the recommended product is generated at least based on the indication of the one or more products viewed online by the user. For example, a product may be recommended to user Fred based on the browsing history 808 saved in his user profile 309. Fred's browsing history indicates that he has recently viewed both the red and black flannel shirts online within the past seven days. The store routing engine 302 may therefore recommend the red and/or black flannel shirt. For example, one of the recommendation rules 313 may be "If user viewed product online within last 7 days then recommend product".

In some embodiments, a system is provided for performing the methods described above. The system may include a memory (e.g. memory 308) to store information such as the indication of the target product and/or the model of passable areas 315 in the store that includes a plurality of contiguous segments, etc. The system may further include at least one processor (e.g. processor 304) to perform operations such as obtaining an identification of a target product for sale by a merchant in a retail store, obtaining a recommended product, and generating an instruction guiding the user along a particular route. In some embodiments, the at least one processor instructs transmission of the instruction for output at the user device, e.g. by incorporating the instruction into a message, and sending the message to a network interface (e.g. network interface 306) for transmission to the user device. If the system is partially or fully implemented at the user device, instructing transmission of the instruction for output at the user device may involve transmitting the instruction, within the user device, to a user interface of the user device for output (e.g. display) at the user device. In some embodiments, a computer-readable medium is provided having stored thereon computer-executable instructions that, when executed by a computer, cause the computer to perform method steps described above.

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

CONCLUSION

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
   identifying, by a processor, a target product for sale by a merchant in a retail store;
   detecting, by the processor communicating with one or more wireless transmitters associated with the retail store, that a user device is in the retail store; and
   responsive to detecting that the user device is in the retail store, the processor providing navigation instructions to the user device, the navigation instructions comprising a particular route to a location of the target product in the retail store, wherein providing the navigation instructions includes:
   tracking, by the processor communicating with the one or more wireless transmitters associated with the retail store, the user device as it moves through the retail store;
   detecting, by the processor, current location data of the user device;
   determining, by the processor, the particular route based on a comparison of cost values between segments of alternative routes to the target product, the segments being assigned respective cost values, wherein the cost value of at least one of the segments is based on both the location of the target product and a location of a second product; and causing, by the processor based on the current location data, the user device to output, on a user interface of the user device, the navigation instructions comprising the particular route, wherein the navigation instructions are configured to cause the user interface of the user device to guide the user along the particular route.

2. The computer-implemented method of claim 1, wherein the navigation instructions to the location of the target product in the retail store are provided using augmented reality.

3. The computer-implemented method of claim 1, wherein providing the navigation instructions to the location of the target product in the retail store includes providing one or both of visual navigation directions or text directions.

4. The computer-implemented method of claim 1, wherein providing the navigation instructions include providing at least one of visual, audio, or haptic feedback, the feedback identifying that the user device is in a location proximate the location of the target product or the location of the second product.

5. The computer-implemented method of claim 1, wherein the one or more wireless transmitters include one or more beacons and wherein at least one of detecting that the user device is in the retail store or tracking the user device as it moves through the retail store utilizes the one or more beacons.

6. The computer-implemented method of claim 1, wherein the second product is a recommended product.

7. The computer-implemented method of claim 1, wherein the second product is selected based on at least one of the target product, a profile associated with the user device, or a criterion associated with the retail store.

8. The computer-implemented method of claim 1, wherein the second product is selected based on at least one of purchase history associated with the user device or a browsing history associated with the user device.

9. A non-transitory computer-readable medium storing computer-executable instructions that, when executed by at least one processor, cause performance of operations comprising:
   identify, by the at least one processor, a target product for sale by a merchant in a retail store;
   detect, by the at least one processor communicating with one or more wireless transmitters associated with the retail store, that a user device is in the retail store; and
   responsive to detecting that the user device is in the retail store, provide navigation instructions to the user device, the navigation instructions comprising a particular route to a location of the target product in the retail store, wherein providing the navigation instructions includes:
      tracking, by the at least one processor communicating with the one or more wireless transmitters associated with the retail store, the user device as it moves through the retail store;
      detecting, by the at least one processor, current location data of the user device;
      determining, by the at least one processor, the particular route based on a comparison of cost values between segments of alternative routes to the target product, the segments being assigned respective cost values, wherein the cost value of at least one of the segments is based on both the location of the target product and a location of a second product; and
      causing, by the at least one processor based on the current location, the user device to output, on a user interface of the user device, the navigation instructions comprising the particular route, wherein the navigation instructions are configured to cause the user interface of the user device to guide the user along the particular route.

10. The computer-readable medium of claim 9, wherein the navigation instructions to the location of the target product in the retail store are provided using augmented reality.

11. The computer-readable medium of claim 9, wherein providing the navigation instructions to the location of the target product in the retail store includes providing one or both of visual navigation directions or text directions.

12. The computer-readable medium of claim 9, wherein providing the navigation instructions include providing at least one of visual, audio, or haptic feedback, the feedback identifying that the user device is in a location proximate the location of the target product or the location of the second product.

13. The computer-readable medium of claim 9, wherein the one or more wireless transmitters include one or more beacons and wherein at least one of detecting that the user device is in the retail store or tracking the user device as it moves through the retail store utilizes the one or more beacons.

14. The computer-readable medium of claim 9, wherein the second product is a recommended product.

15. The computer-readable medium of claim 9, wherein the second product is selected based on at least one of the target product, a profile associated with the user device, or a criterion associated with the retail store.

16. The computer-implemented method of claim 9, wherein the second product is selected based on at least one of purchase history associated with the user device or browsing history associated with the user device.

17. A portable computer system comprising:
   one or more processors;
   a memory storing instructions that, when executed by at least one of the one or more processors, causes the computer system to:
   identify, by the one or more processors, a target product for sale by a merchant in a retail store;
   detect, by communicating with one or more wireless transmitters associated with the retail store, that the computer system is in the retail store; and
   responsive to detecting that the computer system is in the retail store, provide navigation instructions to a user interface of the computer system, the navigation instructions comprising a particular route to a location of the target product in the retail store, wherein providing the navigation instructions includes:
      tracking, by communicating with the one or more wireless transmitters associated with the retail store, the computer system as it moves through the retail store;
      detecting current location data of the computer system;
      determining, by the at least one processor, the particular route based on a comparison of cost values between segments of alternative routes to the target product, the segments being assigned respective cost values, wherein the cost value of at least one of the segments is based on both the location of the target product and a location of a second product; and
      causing the computer system to output, on the user interface based on the current location data, the navigation instructions comprising the particular route, the navigation instructions configured to cause the user interface of the computer system to guide the user along the particular route.

18. The computer system of claim 17, wherein the one or more wireless transmitters include one or more beacons and wherein at least one of detecting that the computer system is in the retail store or tracking the computer system as it moves through the retail store utilizes the one or more beacons.

19. The computer system of claim 17, wherein the navigation instructions to the location of the target product in the retail store are provided using at least one of augmented reality, visual navigation directions, or text directions.

20. The computer system of claim 17, wherein the second product is selected based on at least one of the target product, a profile associated with the computer system, a criterion associated with the retail store, purchase history associated with the computer system, or browsing history associated with the computer system.

\* \* \* \* \*